United States Patent
Ohsaku et al.

(10) Patent No.: US 6,314,353 B1
(45) Date of Patent: Nov. 6, 2001

(54) CONTROL SYSTEM FOR RESILIENT SUPPORT MECHANISM SUCH AS VEHICLE SUSPENSION MECHANISM

(75) Inventors: Satoru Ohsaku, Toyota; Ichisei Kamimura, Okazaki, both of (JP)

(73) Assignee: Toyota Jidoshi Kabushiki Kaisha, Toyota (JP)

( * ) Notice: Subject to any disclaimer, the term of this patent is extended or adjusted under 35 U.S.C. 154(b) by 0 days.

(21) Appl. No.: 09/391,197

(22) Filed: Sep. 7, 1999

(30) Foreign Application Priority Data

Sep. 10, 1998 (JP) .................................. 10-256911
Mar. 24, 1999 (JP) .................................. 11-080203

(51) Int. Cl.⁷ .......................... B60G 15/00; B60G 17/00; B60G 23/00; G06F 7/00; G06F 17/00; G06F 19/00

(52) U.S. Cl. ............................. 701/37; 701/1; 188/266.1; 188/266.2; 188/379; 267/140.14; 267/140.15; 280/5.515; 280/5.519

(58) Field of Search ........................ 701/37, 1; 188/266.1, 188/266.2, 379; 267/140.14, 140.15; 280/5.515, 5.519

(56) References Cited

U.S. PATENT DOCUMENTS

| | | | |
|---|---|---|---|
| 4,693,485 | * | 9/1987 | Kamei et al. .................. 280/6 R |
| 4,953,089 | * | 8/1990 | Wolfe ............................ 364/424.05 |
| 5,412,584 | * | 5/1995 | Umeno et al. ................ 364/558 |
| 5,431,261 | * | 7/1995 | Olgac ............................ 188/379 |
| 5,432,700 | * | 7/1995 | Hrovat et al. ................ 364/424.05 |
| 5,613,009 | * | 3/1997 | Miyazaki et al. ............ 381/71 |
| 5,884,921 | * | 3/1999 | Katsuda ........................ 280/5.515 |

FOREIGN PATENT DOCUMENTS 10-119528   5/1998   (JP) .

OTHER PUBLICATIONS

Nonlinear H state Feedback Controller for semi-active controlled suspension, pp. 1–7.*
Satoru Ohsaku et al., 11. Nonlinear H State Feedback Controller for Semi–Active Controlled Suspension, pp. 1–7.

* cited by examiner

Primary Examiner—William A. Cuchlinski, Jr.
Assistant Examiner—Ronnie Mancho
(74) Attorney, Agent, or Firm—Oliff & Berridge, PLC

(57) ABSTRACT

A control system for a resilient support mechanism such as a suspension mechanism of a wheeled vehicle including a damper disposed between an unsprung mass member and a sprung mass member of the vehicle, wherein a damping coefficient of the damper is divided into a linear portion and a nonlinear portion, and wherein the nonlinear portion of the damping coefficient is defined as a control input u and applied with a frequency weight $W_u(s)$, while a vertical velocity of the sprung mass member, a relative velocity of the sprung mass member to the unsprung mass member and a vertical acceleration of the sprung mass member are defined as an evaluation output $z_p$ and applied with a frequency weight $W_s(s)$. In the control system, a nonlinear $H_\infty$ control theory is applied to a generalized plant to obtain a positive definite symmetric solution P and to calculate a target damping force based on the positive definite symmetric solution P and a state amount such as the vertical velocity of the sprung mass member, a relative displacement of the sprung mass member to the unsprung mass member or the like.

38 Claims, 14 Drawing Sheets

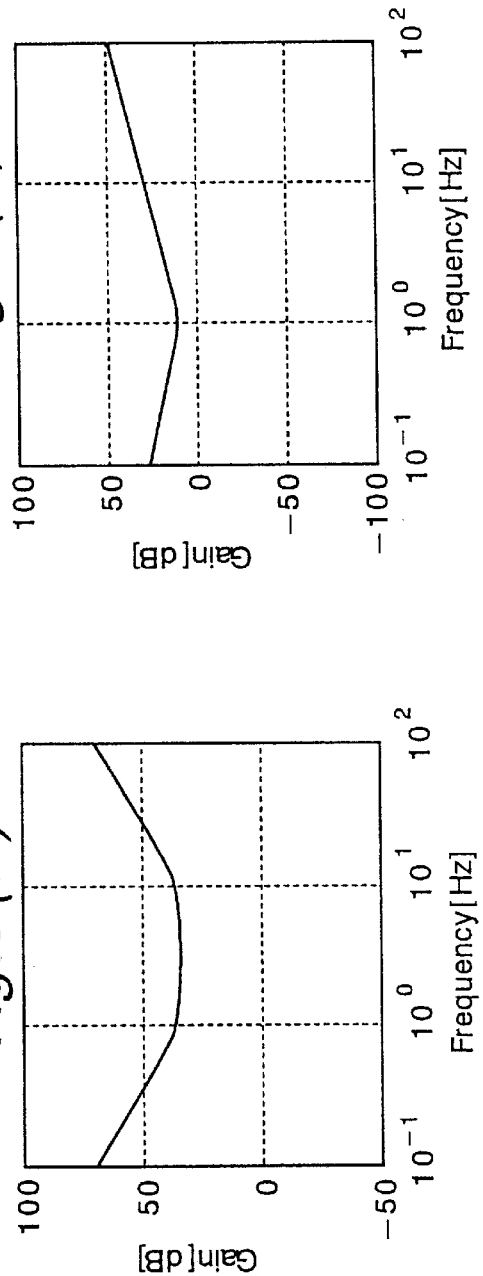
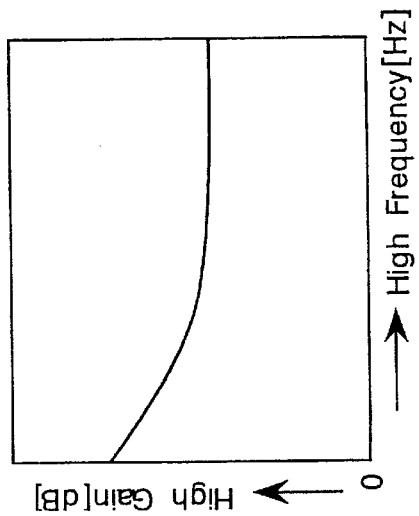
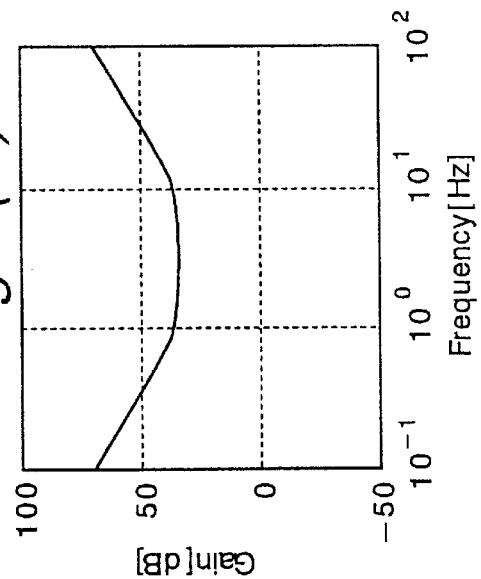
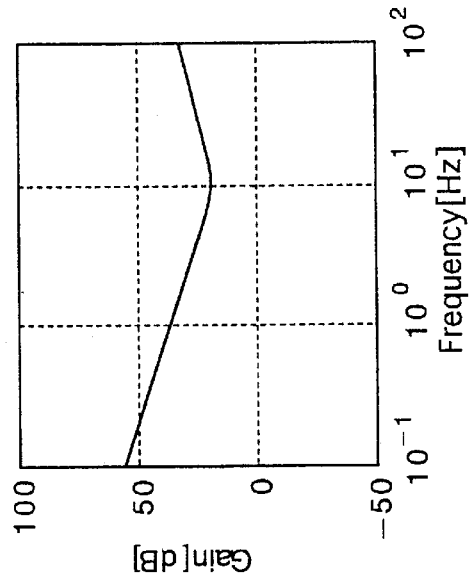

Fig. 5 (A)
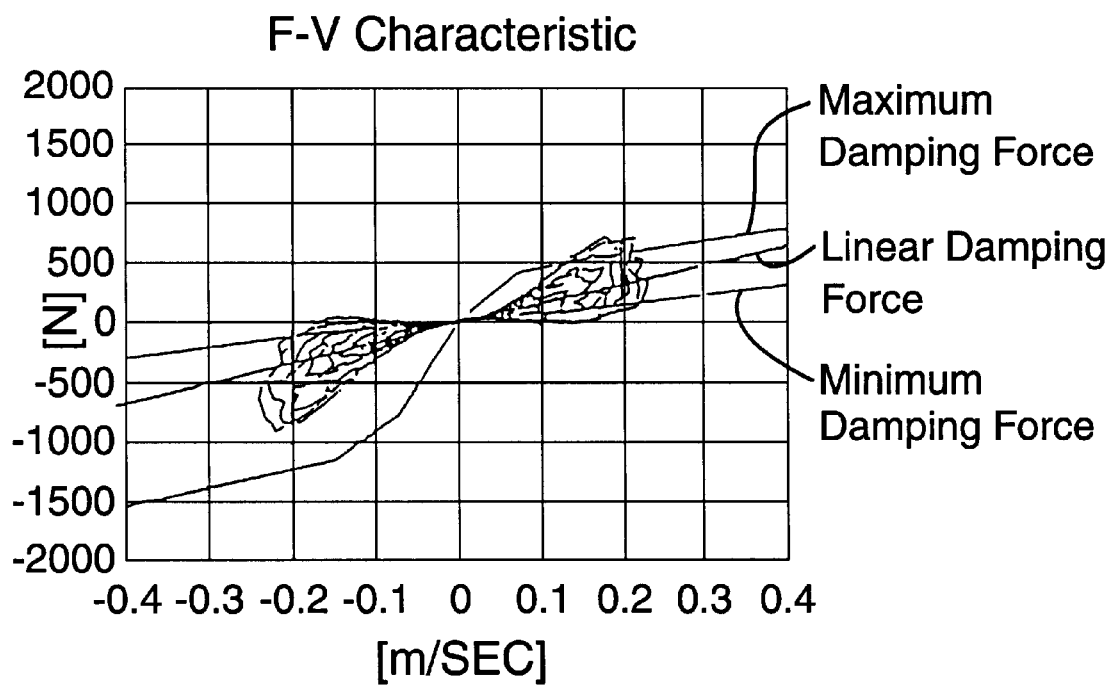
Fig. 5 (B) Related Art
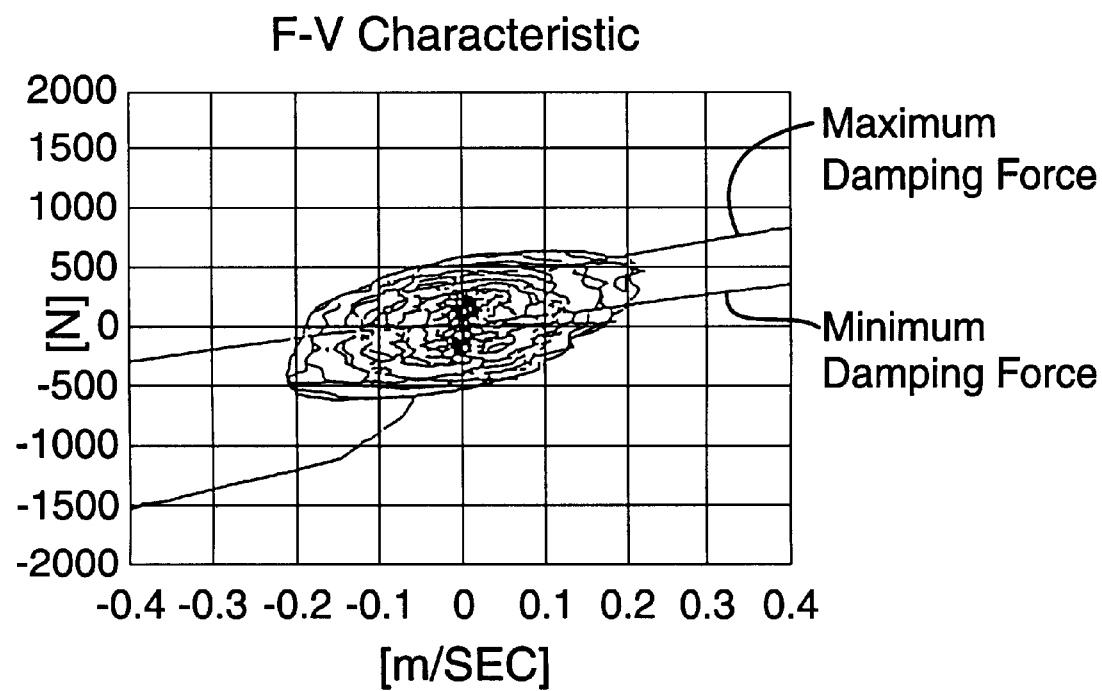

CONTROL SYSTEM FOR RESILIENT SUPPORT MECHANISM SUCH AS VEHICLE SUSPENSION MECHANISM

BACKGROUND OF THE INVENTION

1. Field of the Invention

The present invention relates to a resilient support mechanism for resiliently supporting the component structure of a wheeled vehicle. More particularly, the present invention is concerned with a control system for a resilient support mechanism such as a suspension mechanism disposed between an unsprung mass and a sprung mass of the wheeled vehicle for controlling a damping force or a damping coefficient of a shock absorber or damper device assembled therein.

2. Discussion of the Prior Art

In a conventional suspension mechanism of a wheeled vehicle, an amount of movement state of a sprung mass or an unsprung mass of the vehicle is detected to determine a target damping force or a target damping coefficient on a basis of the detected amount of movement state thereby to adjust the damping force or damping coefficient of a shock absorber or damper device assembled in the suspension mechanism to the target damping force or damping coefficient. Disclosed in Japanese Patent Laid-open Publication No. 10-119528 is a control system for the suspension mechanism in which the well-known sky nook theory is applied to determine a target damping coefficient based on acceleration of the sprung mass and relative velocity of the sprung mass to the unsprung mass in a vertical direction.

In the suspension mechanism described above, however, the damping force of the shock absorber or damper device is defined by the product of the relative velocity of the sprung mass to the unsprung mass and the damping coefficient, while the damping coefficient changes nonlinearly in accordance with the relative velocity of the sprung mass. For this reason, the design of the control system becomes very complicated. For example, it has been considered to estimate a plant indicative of a state space in the suspension mechanism for design of the control system. However, as the plant is bilinear, it is obliged to apply an approximate law to a range where a control input would not be realized in the resilient support mechanism such as a suspension mechanism, even if a linear control theory was applied to the bilinear system. For this reason, a control specification (a norm condition) given at a design stage may not be theoretically satisfied. As a result, the control input becomes discontinuous to cause a sense of incongruity in control of the suspension mechanism.

SUMMARY OF THE INVENTION

It is, therefore, a primary object of the present invention to provide a control system for a resilient support mechanism such as a vehicle suspension mechanism capable of enhancing riding comfort of the vehicle without causing any sense of incongruity in control of the suspension mechanism.

According the present invention, the object is accomplished by providing a control system for a resilient support mechanism including a damper or a shock absorber assembled therein for resiliently supporting thereon an object, wherein a control theory capable of providing a specification for design of the control system in a predetermined frequency range is applied to a nonlinear plant to calculate a target damping force and to adjust an actual damping force of the damper or shock absorber to the calculated target damping force. In a practical embodiment of the present invention, the resilient support mechanism is in the form of a resilient support mechanism in a wheeled vehicle for resiliently supporting a component member of the vehicle such as a vehicle body, a prime mover or the like. In the control system, either one of a nonlinear $H_\infty$ state feedback control, a nonlinear $H_\infty$ output feedback control or a nonlinear $H_\infty$ control using a Kalman filter may be applied as the control theory.

With the control system, a norm condition given at a design stage is satisfied even in a resilient support mechanism in the form of a bilinear system such as a suspension mechanism of a wheeled vehicle so that a control input continuously changes to control a damper in the resilient support mechanism without causing any sense of incongruity in control of the support mechanism.

In the case that the present invention is applied to a suspension mechanism of a wheeled vehicle, it is preferable that the control system comprises detection means for detecting a state amount related to vertical movement of the sprung mass and unsprung mass members, memory means for memorizing a positive definite symmetric solution obtained on a basis of the control theory, and calculation means for calculating the target damping force based on the memorized positive definite symmetric solution and the detected state amount. Alternatively, the control system may comprises detection means for detecting a portion of a plurality of state amounts related to vertical movement of the sprung and unsprung mass members, estimation means for estimating the other portion of the state amounts by using an observer, memory means for memorizing a positive definite symmetric solution obtained on a basis of the control theory, and calculation means for calculating the target damping force based on the memorized positive definite symmetric solution, the detected state amount and the estimated state amount. In this case, it is desirable that a vertical displacement amount of a tire of a road wheel, a relative vertical displacement amount of the sprung mass member to the unsprung mass member, a vertical velocity of the unsprung mass member and a vertical velocity of the sprung mass member are detected as the state amounts.

With the above arrangement, a norm condition given at a design stage is satisfied even in such a bilinear control system described above so that a control input continuously changes to enhance running stability and riding comfort of the vehicle without causing any sense of incongruity in control of the suspension mechanism.

According to an aspect of the present invention, there is provided a control system for a resilient support mechanism such as a suspension mechanism of a wheeled vehicle wherein a damping coefficient of a damper assembled in the resilient support mechanism is divided into a linear portion and a nonlinear portion, and wherein the control system comprises first calculation means for calculating the nonlinear portion of the damping coefficient on a basis of a nonlinear $H_\infty$ control theory and second calculation means for calculating a target damping coefficient based on synthesis of the linear portion of the damping coefficient and the calculated nonlinear portion, in the control system, a target damping force may be calculated by detecting or estimating a relative velocity of a sprung mass member to an unsprung mass member and multiplying the relative velocity by the calculated target damping coefficient.

According to another aspect of the present invention, there is provided a control system for a resilient support mechanism wherein a damping coefficient of a damper assembled in the support mechanism is divided into a linear portion and a nonlinear portion, and wherein each gain of the linear portion and nonlinear portion is defined in such a manner that a target damping force is determined in a range of an actual damping force produced by the damper. In the control system, it is preferable that the linear portion of the damping coefficient of the damper is defined to be located between a minimum damping force of the damper and a maximum damping force of the damper. With the control system, a control specification or a norm condition given at a design state is satisfied in such a manner that a control input continuously changes to control the support mechanism without causing any sensor of incongruity.

According to a further aspect of the present invention, there is provided a control system for a resilient support mechanism wherein a damper assembled in the support mechanism is constructed to be switched over at plural steps, wherein a damping coefficient of the damper is divided into a linear portion and a nonlinear portion, and wherein the linear portion of the damping coefficient is determined in such a manner that a damping force defined by the linear portion becomes approximately equal to a damping force produced by the damper at its either one of plural steps in a small range. In the control system, the linearity of the damping force relative to the relative velocity becomes strong in the small rang such that the nonlinear portion becomes approximately zero. With the control system, the changeover frequency of the damper is restrained to enhance the durability of the damper.

According an aspect of the present invention, there is provided a control system for a resilient support mechanism wherein a damping coefficient of a damper assembled in the support mechanism is divided into a linear portion and a nonlinear portion, wherein the nonlinear portion is applied as a control input to a generalized plant estimated to calculate a target damping force, and wherein the control input is applied with a predetermined frequency weight.

According to another aspect of the present invention, there is provided a control system for a suspension mechanism of a wheeled vehicle wherein a physical amount related to vertical movement of sprung and unsprung mass members is applied as an evaluation output of a generalized plant estimated to calculate a target damping force, and wherein the physical amount is applied with a predetermined frequency weight. In the control system, a vertical acceleration, a vertical velocity and a vertical displacement amount of the sprung mass member influential in resonance of the sprung mass member, a vertical velocity of the unsprung mass member, a relative velocity of the unsprung mass member to the sprung mass member, a tire displacement amount influential in resonance of the unsprung mass member can be utilized as the physical amount. Preferably, the vertical velocity of the sprung mass member influential in resonance of the sprung mass member and the relative velocity of the sprung mass member to the unsprung mass member influential in resonance of the unsprung mass member are utilized as that physical amount to restrain undesired influence to the vehicle in accordance with frequency ranges.

In the control system described above, it is preferable that the physical amount includes plural kinds of physical amounts, wherein each maximum range of frequency weights applied to the physical amounts is determined without causing any mutual interference. With such arrangement of the control system, it is able to independently restrain each undesired influence of the physical amounts to the suspension mechanism. In this case, it is preferable that the physical amounts includes at least two factors selected from a vertical velocity of the sprung mass member, a relative velocity of the sprung mass member to the unsprung mass member and a vertical acceleration of the sprung mass member to eliminate each resonance of the sprung and unsprung mass members and deterioration of riding comfort of the vehicle.

According to a further aspect of the present invention, there is provided a control system for a suspension mechanism including a damper disposed between an unsprung mass member and a sprung mass member of a wheeled vehicle, wherein a damping coefficient of the damper is divided into a linear portion and a nonlinear portion, wherein a control theory capable of providing a specification for design of the control system in a predetermined frequency range is applied to a nonlinear plant to calculate a target damping force and to adjust an actual damping force of the damper to the calculated target damping force, and wherein a travel speed of the vehicle or a mass of the sprung mass member is detected to control the linear portion of the damping coefficient in accordance with the travel speed of the vehicle or the mass of the sprung mass member. Since in the control system, the linear portion of the damping coefficient of the damper is varied in accordance with the travel speed of the vehicle or the mass of the sprung mass member, a sensory characteristic in a desired performance of the vehicle is enhanced.

In the control system, it is preferable that a change of the linear portion of the damping coefficient is prohibited when the calculated target damping force chances more that a predetermined value in response to change of the linear portion of the damping coefficient, and it is also preferable that a change of the frequency weight in the generalized plant is prohibited when the calculated target damping force changes more than a predetermined value due to change of the frequency weight. Such arrangement of the control system is useful to eliminate discontinuity of the target damping force and a second of incongruity in control of the damping force.

BRIEF DESCRIPTION OF THE DRAWINGS

Other objects, features and advantages of the present invention will be more readily appreciated from the following detailed description of preferred embodiments thereof when taken together with the accompanying drawings, in which:

Other objects, features and advantages of the present invention will be more readily appreciated from the following detailed description of preferred embodiments thereof when taken together with the accompanying drawings, in which:

FIGS. 3(A) to 3(C) each are a graph showing a gain in relation to a frequency region;

FIG. 3(D) is a graph showing a frequency weight in relation to a variable damping coefficient;

FIG. 5(A) illustrates a Lissajous's figure showing a characteristic of a difference (F–V) between a damping force and a relative velocity under control of a damping force according to the present invention;

FIG. 5(B) is a Lissajous's figure showing a characteristic of a difference (F–V) between a damping force and a relative velocity under a conventional skyhook control;

Figure 1:
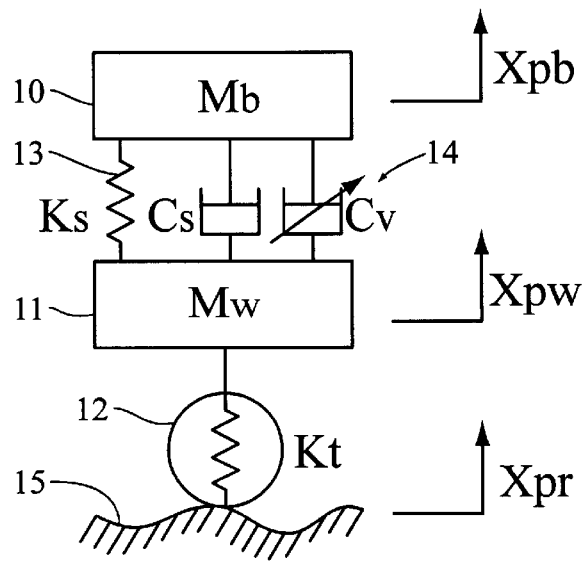
FIG. 1 is a schematic illustration of a quarter car model widely used to analyze the basic properties of suspension systems in wheeled vehicles.

DESCRIPTION OF THE PREFERRED EMBODIMENTS a. Problems in Design of a Model and a Control System:

First of all, a model of a vehicle suspension mechanism has been considered to represent a state space of the suspension mechanism. In FIG. 1, there is schematically illustrated a model of a suspension mechanism of a road wheel in a wheeled vehicle, wherein the character $M_b$ represents the mass of a sprung mass member 10 such a vehicle body, the character $M_w$ represents the mass of an unsprung mass member 11 such as a lower arm or a road wheel, and the character $K_t$ represents a spring constant of a road wheel tire 12. The character $K_s$ represents a spring constant of a spring 13 disposed in the suspension mechanism between the sprung mass member 10 and unsprung mass member 11, the character $C_s$ represents a linear portion of a damping coefficient C of a shock absorber or damper device 14 in the suspension mechanism (hereinafter referred to a linear damping coefficient) and the character $C_v$ represents a non-linear portion of the damping coefficient C (hereinafter referred to a non-linear damping coefficient). A total of the linear damping coefficient $C_s$ and non-linear damping coefficient $C_v$ is represented as an overall damping coefficient of the shock absorber 14. The reference numeral 15 indicates a road surface.

Assuming that each displacement amount of the spring mass member 10, unsprung mass member 11 and road surface 15 is respectively represented as $x_{pb}$, $x_{ow}$, $x_{pr}$, the following equations (1) and (2) are given.

$$M_b x_{pb}'' = K_s(x_{pw}-x_{pb}) + C_s(x_{pw}'-x_{pb}') + C_v(x_{pw}'-x_{pb}') \tag{1}$$

$$M_w x_{pw}'' = K_t(x_{pr}-x_{pw}) - K_s(x_{pw}-x_{pb}) - C_s(x_{pw}'-x_{pb}') - C_v(x_{pw}'-x_{pb}') \tag{2}$$

Provided that, the sign -'- represents once differentiation, and the sign -"- represents twice differentiation.

A control input in the suspension mechanism is a variable damping coefficient $C_v$. Assuming that the disturbance $w_1$ from the road surface is a road surface velocity $x_{pr}'$ and that the variable damping coefficient $C_v$ is applied as a control input to represent a state space of the suspension mechanism, the following equation is given.

$$x_p' = A_p x_p + B_{p1} w_1 + B_{p2}(x_p) u \tag{3}$$

where $$X_p = \begin{bmatrix} X_{pr} - X_{pw} \\ X_{pw} - X_{pb} \\ X_{pw}' \\ X_{pb}' \end{bmatrix} \tag{4}$$

$$A_p = \begin{bmatrix} 0 & 0 & -1 & 0 \\ 0 & 0 & 1 & -1 \\ K_t/M_w & -K_s/M_w & -C_s/M_w & C_s/M_w \\ 0 & K_s/M_b & C_s/M_b & -C_s/M_b \end{bmatrix} \tag{5}$$

$$B_{p1} = \begin{bmatrix} 1 \\ 0 \\ 0 \\ 0 \end{bmatrix} \tag{6}$$

$$B_{p2}(x_p) = \begin{bmatrix} 0 \\ 0 \\ -(x_{pw}' - x_{pb}')/M_w \\ (x_{pw}' - x_{pb}')/M_b \end{bmatrix} \tag{7}$$

In the present invention, the target for enhancement of the characteristic of the suspension mechanism is directed to simultaneously restrain the vertical velocity $x_{pb}'$ of the sprung mass (hereinafter referred to sprung mass velocity) greatly influential in vibration of the sprung mass member, the vertical acceleration $x_{pb}''$ of the sprung mass member 10 (hereinafter referred to the acceleration of the sprung mass member) greatly influential in riding comfort of the vehicle, and the vertical relative velocity $x_{pw}'-x_{pb}'$ of the unsprung mass member 11 to the sprung mass member 10 (hereinafter referred to the relative velocity $x_{pw}'-x_{pb}'$) greatly influential in vibration of the unsprung mass member 11. Thus, the sprung mass velocity $x_{pb}'$, acceleration $x_{pb}''$ and relative velocity $x_{pw}'-x_{pb}'$ each are used as an evaluation output $z_p$ in the following description. As in the suspension mechanism, it is easy to detect the acceleration $x_{pb}''$ of the sprung mass member and the relative displacement amount $x_{pw}-x_{pb}$ of the sprung mass member 10 to the unsprung mass member 11 (hereinafter referred to the relative displacement amount $x_{pw}-x_{pb}$), an observation output $y_p$ is basically defined by the acceleration $x_{pb}''$ and relative displacement amount $x_{pw}-x_{pb}$. Assuming that an observation noise $w_2$ is included in the observation output $y_p$, the state space of the suspension mechanism is represented as follows.

$$z_p = C_{p1} x_p + D_{p12}(x_p) u \tag{8}$$

$$y_p = C_{p2} x_p + D_{p21} w_2 + D_{p22}(x_p) u \tag{9}$$

where $$z_p = \begin{bmatrix} x_{pb}'' \\ x_{pb}' \\ x_{pw}' - x_{pb}' \end{bmatrix} \quad (10)$$

$$y_p = \begin{bmatrix} x_{pb} \\ x_{pw} - x_{pb} \end{bmatrix} \quad (11)$$

$$C_{p1} = \begin{bmatrix} 0 & K_s/M_b & C_s/M_b & -C_s/M_b \\ 0 & 0 & 0 & 1 \\ 0 & 0 & 1 & -1 \end{bmatrix} \quad (12)$$

$$D_{p12}(x_p) = \begin{bmatrix} (x_{pw}' - x_{pb}')/M_b \\ 0 \\ 0 \end{bmatrix} \quad (13)$$

$$C_{p2} = \begin{bmatrix} 0 & K_s/M_b & C_s/M_b & -C_s/M_b \\ 0 & 1 & 0 & 0 \end{bmatrix} \quad (14)$$

$$D_{p21} = \begin{bmatrix} 1 & 0 \\ 0 & 1 \end{bmatrix} \quad (15)$$

$$D_{p22}(x_p) = \begin{bmatrix} (x_{pw}' - x_{pb}')/M_b \\ 0 \end{bmatrix} \quad (16)$$

However, the state space of the suspension mechanism is represented in the form of a bilinear system since the state amount $x_p$ is included in the coefficient $B_{p2}(x_p)$ as shown in the equation (3). As in the bilinear system the coefficient $B_{p1}(o)$ becomes "0" even if the control input u is varied at the original point x=0, the control at the original point is impossible. For this reason, the design of the control system for the suspension mechanism may not be realized on a basis of the linear control theory. Accordingly, the present invention was made on a basis of a nonlinear $H_\infty$ control theory to design a control system for restraint of the sprung mass velocity $x_{pb}'$, acceleration $x_{pb}''$ and relative velocity $x_{pw}'-x_{pb}'$. Hereinafter, various kinds of designs of the nonlinear $H_\infty$ control system according to the present invention will be described.

b. First Embodiment:

b1. Design of a Nonlinear $H_\infty$ State Feedback Control System.

Figure 2:
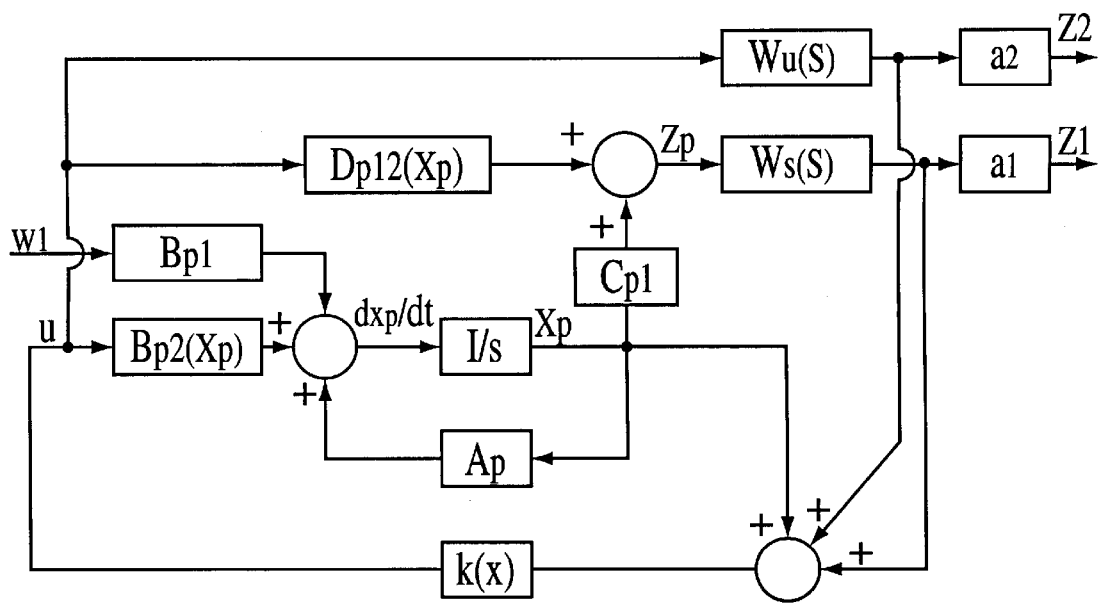
FIG. 2 is a block diagram of a non-linear $H_\infty$ state feedback control system in a first embodiment of the present invention.

For design of a nonlinear $H_\infty$ state feedback control system, a generalized plant consisting of an evaluation output $z_p$ and a control input u added with a frequency weight was estimated as shown in FIG. 2. In this case, the frequency weight is a dynamic weight which is given as a transfer function and changes in accordance with a frequency. With the frequency weight, the weight can be increased in a frequency range where it is desired to enhance control performance of the system and can be decreased in a frequency range where control performance of the system may be disregarded. In addition, after multiplied by frequency weights $W_s(s)$, $W_u(s)$, the evaluation output $z_p$ and control input u were multiplied by functions $a_1(x)$, $a_2(x)$ of a state amount x as a nonlinear weight function. To obtain a solution based on a Riccati inequality, the nonlinear weights $a_1(x)$, $a_2(x)$ are defined as follows.

$$a_1(x) > 0, a_2(x) > 0 \quad (17)$$

$$a_1(o) = a_2(o) = 1 \quad (18)$$

With the nonlinear weights, it was able to design a control system for positively restraining the $L_2$ gain. The state space of the system is represented by the following equation.

$$x_p' = A_p x_p + B_{p1} w_1 + B_{p2}(x_p) u \quad (19)$$

Where the state space of frequency weights $W_s(s)$ for the evaluation output $z_p$ is expressed by the following equations.

$$x_w' = A_w x_w + B_w z_p \quad (20)$$

$$z_w = C_w x_w + D_w z_p \quad (21)$$

In the equations (20) and (21), the value $x_w$ represents a state amount of the frequency weights $W_s(s)$, the value $z_w$ represents an output of the frequency weights $W_s(s)$, and the characters $A_w$, $B_w$, $C_w$, $D_w$ represent constant matrixes defined by the control specification. These constant matrixes $A_w$, $B_w$, $C_w$, $D_w$ each are determined to reduce a gain in relation to the sprung mass acceleration $x_b''$ in a frequency range of about 3 to 8 Hz for enhancement of riding comfort of the vehicle as shown in FIG. 3(A) to reduce a gain in relation to the sprung mass velocity $x_b'$ in a frequency range of about 0.5 to 1.5 Hz for restraining resonance of the sprung mass member 10 as shown in FIG. 3(B) and to reduce a gain in relation to the relative velocity $x_w'-x_b'$ in a frequency range of about 10 to 14 Hz for avoiding resonance of the unsprung mass member 11 as shown in FIG. 3(C). Thus, each factor of the sprung mass acceleration $x_b''$, sprung mass velocity $x_b'$ and relative velocity $x_w'-x_b'$ for the evaluation output $z_p$ is independently controlled in such a manner that the frequency ranges for reduction of the gains may not be overlapped.

The state space of frequency weights $W_u(s)$ for the control input u is represented by the following equations.

$$x_u' = A_u x_u + B_u u \quad (22)$$

$$z_u = C_u x_u + D_u u \quad (23)$$

Where the value $x_u$ represents a state amount of the frequency weights $W_u(s)$, the value $z_u$ represents an output of the frequency weight $W_u(s)$, and the characters $A_u$, $B_u$, $C_u$, $D_u$ represents constant matrixes. These constant matrixes $A_u$, $B_u$, $C_u$, $D_u$ are determined to restrain a gain in relation to the control input u in the high frequency range taking into account the frequency characteristics of an electric actuator for control of the damping coefficient as shown in FIG. 3(D). In this instance, the state space of the generalized plate in the nonlinear $H_\infty$ state feedback control system is expressed as follows.

$$x' = Ax + B_1 w_1 + B_2(x) u \quad (24)$$

$$z_1 = a_1(x)(C_{11}x + D_{121}(x)u) \quad (25)$$

$$Z_2 = a_2(x)(C_{12}x + D_{122}u) \quad (26)$$

Where the factors x, A, $B_1$, $B_2(x)$, $C_{11}$, $D_{121}(x)$, $C_{12}$ and $D_{122}$ are represented by the following equations.

$$x = \begin{bmatrix} x_p \\ x_w \\ x_u \end{bmatrix} \quad (27)$$

$$A = \begin{bmatrix} A_p & 0 & 0 \\ B_w C_{p1} & A_w & 0 \\ 0 & 0 & A_u \end{bmatrix} \quad (28)$$

$$B_1 = \begin{bmatrix} B_{p1} \\ B_w D_{p11} \\ 0 \end{bmatrix} \quad (29)$$

$$B_2(x) = \begin{bmatrix} B_{p2}(x_p) \\ B_w D_{p l 2}(x_p) \\ B_u \end{bmatrix} \quad (30)$$

$$C_{11} = [D_w C_{p1} C_w o] \quad (31)$$

$$D_{121}(x) = [D_w D_{p12}(x_p)] \quad (32)$$

$$C_{12} = [o o C_u] \quad (33)$$

$$D_{122} = D_u \quad (34)$$

When the state space of the generalized plant represented by the foregoing equations (24) to (26) is substituted in expression in a condition defined by the following equation (35) to obtain a solution based on the Riccati inequality, the following equations (36) to (38) are given.

$$D_w D_{p12}(x) = 0 \quad (35)$$

$$x' = Ax + B_1 w + B_2(x) u \quad (36)$$

$$z_1 = a_1(x) C_{11} x \quad (37)$$

$$z_2 = a_2(x) C_{12} x + a_2(x) D_{122} u \quad (38)$$

Since the factor A is a stable matrix indicative of the damping control system, a nonlinear $H_\infty$ state feedback control law for the generalized plant was designed in such a manner as to satisfy the facts that a closed loop system is stable in internal exponent and that the gain $L_2$ from the disturbance w from the road surface to the evaluation output z is less than a positive constant $\gamma$.

The nonlinear $H_\infty$ state feedback control law can be obtained in the case that the following conditions are satisfied.

1) In a condition where the positive constant is given under existence of $D_{122}^{-1}$, there exists a positive definite symmetric solution P which satisfies the following Riccati inequality (39).

2) In the case that the nonlinear weights $a_1(x)$, $a_2(x)$ satisfy a condition for restriction defined by the following formula (40), one of control laws u=k (x) for making the closed loop internally stable and reducing the $L_2$ gain less than $\gamma$ is given by the following equation (41).

$$PA + A^T P + \frac{P B_1 B_1^T P}{\gamma^2} + C_{11}^T C_{11} + C_{12}^T C_{12} < 0 \quad (39)$$

$$(1 - a_1(x)^2) x^T C_{11}^T C_{11} x + \left[ \frac{1}{a_2(x)^2} - 1 \right] x^T P B_2(x) D_{122}^{-1} D_{122}^{-T} B_2^T(x) P x \geq 0 \quad (40)$$

$$u = k(x) \quad (41)$$
$$= -D_{122}^{-1} \left[ \frac{1}{a_2(x)^2} D_{122}^{-1} B_2^T(x) P + C_{12} \right] x$$

The nonlinear weights $a_1(x)$, $a_2(x)$ satisfying the condition for restriction defined by the equation (41) are expressed as follows.

$$a_1(x) = \sqrt{1 + m_1(x) x^T P B_2(x) D_{122}^{-1} D_{122}^{-T} B_2^T(x) P x} \quad (42)$$

$$a_2(x) = \sqrt{\frac{1}{1 + m_1(x) x^T C_{11}^T C_{11} x}} \quad (43)$$

In the equations (42), (43), $m_1(x)$ is an appropriated positive definite function. As a result of calculation, the foregoing positive definite symmetric solution P could be obtained. Using the equation (43), the equation (41) is converted into the following equation.

$$u = k(x) \quad (44)$$
$$= -D_{122}^{-1} ((1 + m_1(x) x^T C_{11}^T C_{11} x) D_{122}^{-T} B_2^T(x) P + C_{12}) x$$

For design of the control system based on the nonlinear $H_\infty$ control theory, it is, in general, required to solve a partially differential inequality so called the Hamilton-Jacobi inequality. In the case that the nonlinear weights $a_1(x)$, $a_2(x)$ are applied with the condition for restriction defined by the equation (40), however, the design of the control system can be made by solution of the Riccati inequality in stead of the Hamilton-Jacobi inequality. Since the Riccati inequality can be solved in a simple manner by using a well-known software such as Matlab, the positive definite symmetric solution P can be found in a simple manner, and the control law u=k (x) can be derived.

In addition, the factor $D_{122}$ does not appear in the Riccati inequality, and only the condition for restriction to the nonlinear weights and the control law are concerned with the Riccati inequality. This means that the control law using the factor $D_{122}$ can be adjusted without resolution of the Riccati inequality. The adjustment of the control law means scaling to the control input. When the scaling of the control input is made ten times, the factor $D_{122}$ becomes one tenth, the term $B_2(x)$ of the equation (41) becomes one hundred times, and the term $C_{12}$ of the equation (41) becomes ten times.

To confirm the role of the nonlinear weights, a generalized plant of a bilinear system was assumed to compare with the generalized plant using the nonlinear weights. In this instance, the nonlinear weights $a_1(x)$, $a_2(x)$ were defined as $a_1(x)=1$, $a_2(x)=1$, and the factors $C_{12}$, $D_{122}$ were defined as $C_{12}=o$, $D_{122}=I$. Thus, the state space represented by the equation (35) to (38) are expressed as follows.

$$x' = Ax + B_1 w + B_2(x) u \quad (45)$$

$$z_1 = C_{11} x \quad (46)$$

$$z_2 = u \quad (47)$$

Thus, the control law u=k (x) of the generalized plant is expressed as follows.

$$u = B_2^T(x) P x \quad (48)$$

Provided that, P is a positive definite symmetric solution which satisfies the following Riccati inequality.

$$PA + A^T P + \frac{1}{\gamma^2} P B_1 B_1^T P + C_{11}^T C_{11} < 0 \quad (49)$$

On the other hand, a linear approximate system adjacent the original point of the generalized plant represented by the equations (45) to (47) is expressed as follows.

$$x' = Ax + B_1 w \quad (50)$$

$$z_1 = C_{11} x \quad (51)$$

$$z_2 = u \quad (52)$$

Figure 4:
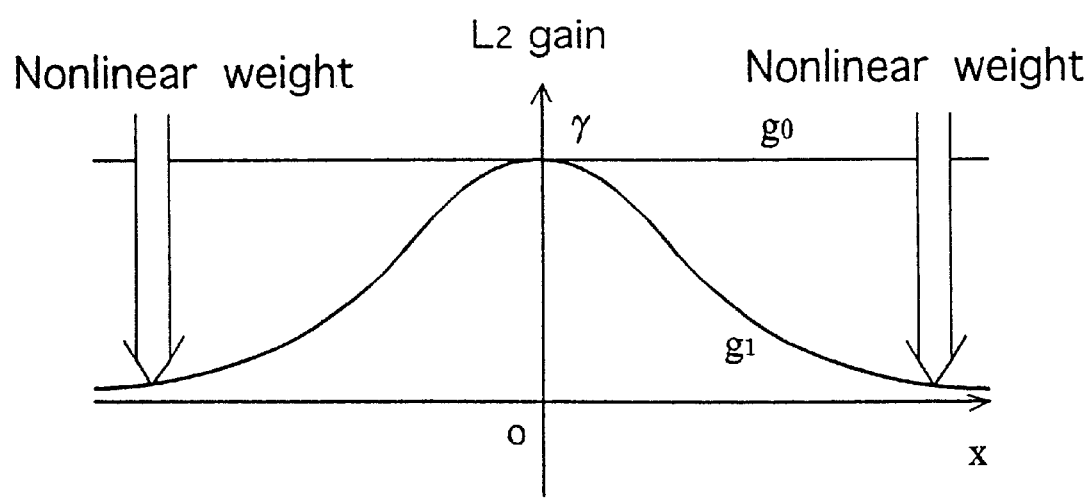
FIG. 4 is an image view showing functional effects based on a nonlinear $H_\infty$ control theory.

The Riccati inequality (49) indicates that the closed loop of the generalized plant is internally stable and that the $L_2$ gain is less than $\gamma$. That is to say, the $L_2$ gain oI the bilinear system is determined by a value at the original point (x=o) shown in FIG. 4 since the bilinear system is defined as $B_2(o) = o$ at the original point where the control input does effect to improve the $L_2$ gain. In the case that the control input is defined as u=o, the generalized plant defined by the equations (45) to (47) coincides with the generalized plant defined by the equations (50) to (52). As a result, even in the case that the control input u to the generalized plant defined by the equations (45) to (47) is defined as u=o, the Riccati inequality indicates that the closed loop system is internally stable and that the $L_2$ gain is less than $\gamma$. This means that even if the control input u becomes effective due to an increase of the state amount x, the $L_2$ gain does not increase more than $g_O$ in a control system designed for the generalized plant defined by the equations (45) to (47), wherein the control output is defined by the following equations (53) and (54).

$$z_1 = C_{11} x \quad (53)$$

$$z_2 = u \quad (54)$$

In this instance, it is assumed that the control performance is enhanced by the control input or does not change as in the case or u=o. Accordingly, the control system can be designed on a basis of the following equations (55) and (56) so that the $L_2$ gain of the plant is decreased by the nonlinear weights as shown by a characteristic line $g_1$ in FIG. 4.

$$z_1 = a_1(x) C_{11} x \quad (55)$$

$$z_2 = a_2(x) u \quad (56)$$

In this embodiment, the damping coefficient C of damper 14 was divided into the linear damping coefficient $C_s$ and the nonlinear variable damping coefficient $C_v$ to design the control system wherein the variable damping coefficient is applied as the control input u. As shown in FIG. 5(A), the linear damping coefficient C was defined to be located approximately at a center between a minimum damping force characteristic line of the damper 14 (corresponding with a maximum opening degree of a damper orifice 14a) and a maximum damping force characteristic line (corresponding with a minimum opening degree of the damper orifice), and the gain of the control input u was adjusted in accordance with a frequency so that the damping coefficient C changes at both sides of the linear damping coefficient $C_s$ and that the damping force defined by the damping coefficient C is placed between the minimum damping force characteristic line and the maximum damping force characteristic line. Thus, the variable damping coefficient $C_v$ can be determined in accordance with the design specification of the damper 14 in a simple manner. As a result, a desired control of the damping force can be realized in a range defined by actual function of the damper 14. For comparison with the damping force control in the present invention, illustrated in FIG. 5(B) is a Lissajous's figure in the case that the damping coefficient of the damper 14 is controlled on a basis of the conventional skyhook theory, wherein a desired control of the damping force may not be realized.

In the case that the damping force or damping coefficient of the damper 14 is switched over at plural steps, the linear damping coefficient $C_s$ is determined in such a manner that he damping force defined by the linear damping coefficient $C_s$ becomes equal to a damping force produced by the damper 14 at either one of the plurality steps in a small range. In this kind of suspension mechanisms, a linearity relative to the relative velocity of the damping force is strong in a small range of the damping force where the variable damping coefficient $C_v$ is calculated as "0". For this reason, the damper 14 is maintained at either one of the plural steps without frequently being switched over. This is useful to enhance the durability of the damper 14.

b2. Practical Embodiment of the Present Invention in a Wheeled Vehicle.

Figure 6:
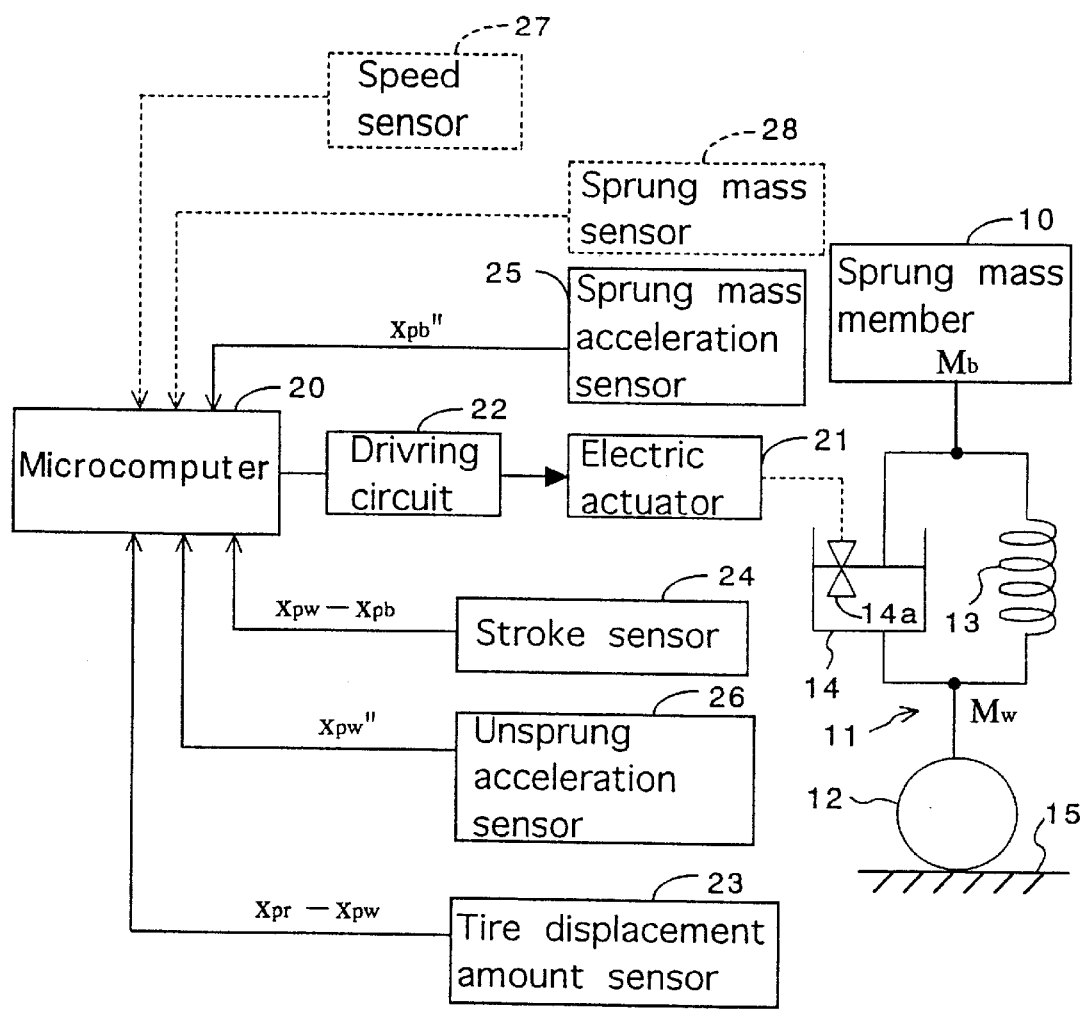
FIG. 6 is a block diagram illustrating a damping force control system in a wheeled vehicle.

Hereinafter, a practical embodiment in a wheeled vehicle, based on the nonlinear $H_\infty$ state feedback control law will be described with reference to FIG. 6. Illustrated in FIG. 6 is a damping force control system which comprises a stepper motor for switching over an opening degree OP of an orifice 14a of the damper 14 at plural steps (N steps) and an electric actuator 21 such an ultrasonic motor. The stepper motor is designed to control the opening degree of the damper orifice 14a in such a manner that a damping force produced by the damper 14 at each step thereof becomes approximately equal to a damping force determined by a linear damping coefficient $C_s$ calculated by processing of a control program shown by a flow chart in FIG. 7.

The electric actuator 21 is activated under control of a microcomputer 20 through a driving circuit 22. The microcomputer 20 is connected to a tire displacement amount sensor 23, a stroke sensor 24, a sprung mass acceleration sensor 25 and an unsprung mass acceleration sensor 26. The tire displacement amount sensor 23 is arranged to detect a displacement amount $x_{pr} - X_{pw}$ defined by a relative displacement amount of road surface displacement $x_{pr}$ and unsprung mass displacement $x_{pw}$. For example, the displacement amount $x_{pr} - x_{pw}$ is detected by an output of a strain sensor for detecting deformation of the tire and an output of a pressure sensor for detecting an air pressure of the tire. The stroke sensor 24 is disposed between the sprung mass member 10 and the unsprung mass member 11 to detect an amount of vertical relative displacement of the sprung mass member 10 to the unsprung mass member 11. The sprung mass acceleration sensor 25 is fixedly mounted on the sprung mass member 10 to detect vertical acceleration $x_{pb}"$ of the sprung mass member 10. The unsprung mass acceleration sensor 26 is fixedly mounted on the unsprung mass member 11 to detect vertical acceleration $x_{pw}"$ of the unsprung mass member 11.

Figure 7:
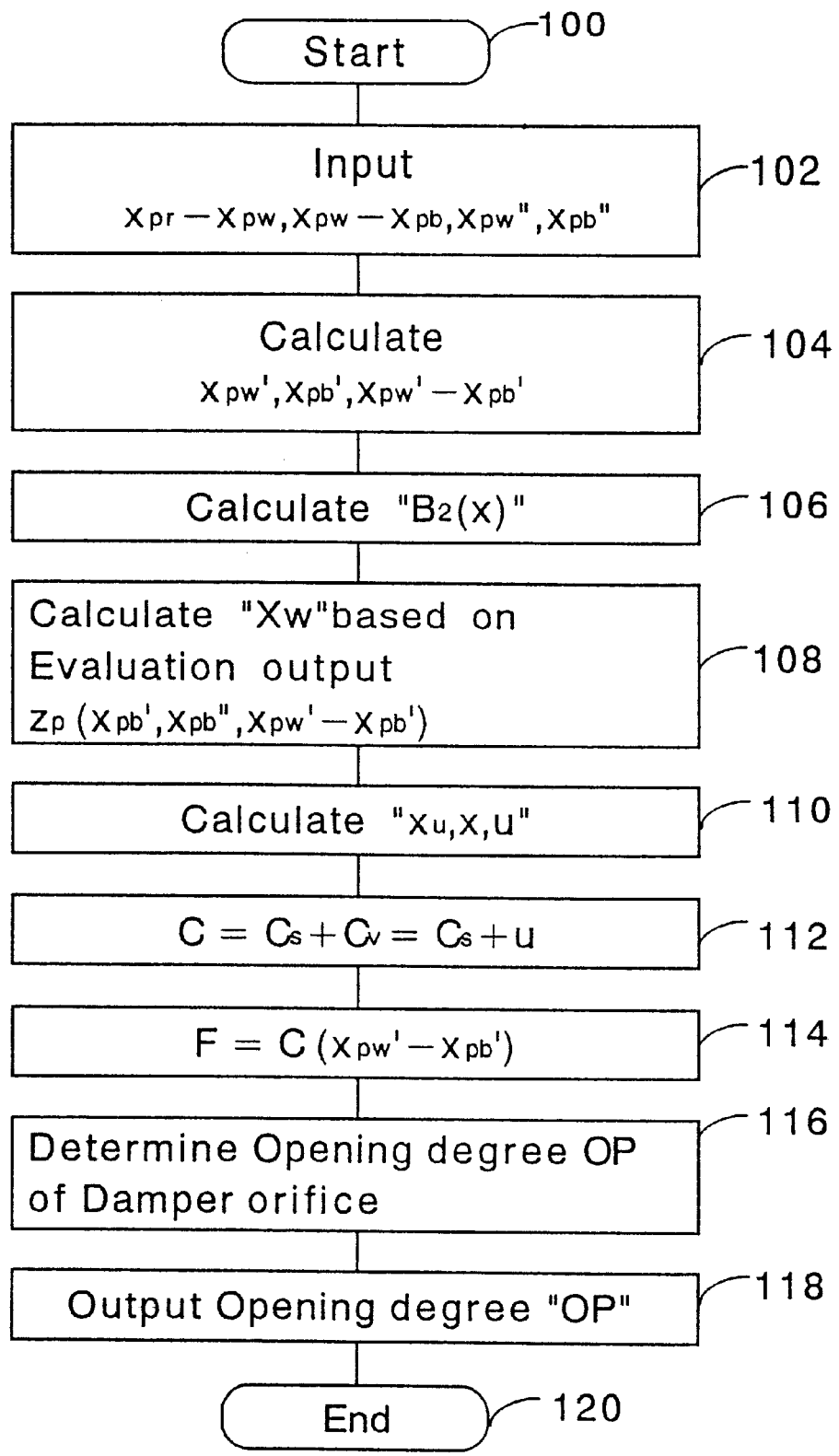
FIG. 7 is a flow chart of a control program executed by a microcomputer shown in FIG. 6.
Figure 8:
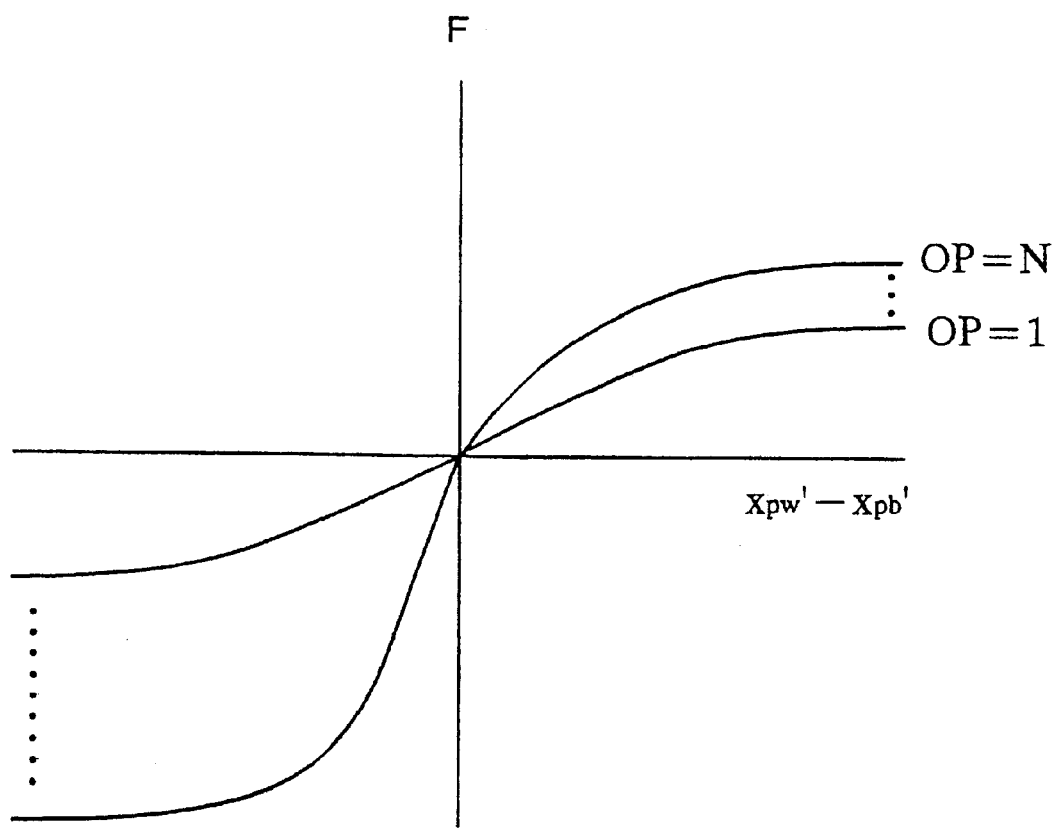
FIG. 8 is a graph showing a data characteristic in a relative velocity-damping force table stored in the microcomputer of FIG. 6.

The microcomputer 20 is provided to execute the control program of FIG. 7 at each lapse of a predetermined short time for applying a control signal indicative of a target opening degree OP of the damper orifice 14a at each step of the damper 14 to the driving circuit 22. The microcomputer 20 includes a relative velocity-damping table provided to memorize a data indicative of variation characteristics of a damping force F of the damper 14 in relation to a relative velocity $x_{pw}' - x_{pb}'$ at each step of the damper 14 as shown in FIG. 8.

Hereinafter, operation of the damping control system will be described. Assuming that an ignition switch (not shown) of the vehicle has been closed, the microcomputer 20 is activated to repeat execution of the control program of FIG. 7 at each lapse of the short time for control of the damping force of damper 14. The computer 20 starts at step 100 to execute the control program and inputs at step 102 detection signals respectively indicative of the tire displacement amount $x_{pr} - x_{pw}$, relative displacement amount $x_{pw} - x_{pb}$, sprung mass acceleration $x_{pb}"$ and unsprung mass acceleration $x_{pw}''$ from sensors 23, 24, 25 and 26. Subsequently, the computer 20 calculates at step 104 a sprung mass velocity $x_{pb}'$ and an unsprung mass velocity $x_{pw}'$ by time integration of the sprung mass acceleration $x_{pb}''$ and unsprung mass acceleration $x_{pw}''$ and calculates a relative velocity $x_{pw}'-x_{pb}'$ by time differentiation of the relative displacement amount $x_{pw}-x_{pb}$.

The following step 106, die computer 20 calculates $B_{p2}(x_{p,}D_{p12}(x_p)$ and $B_2(x)$ respectively on a basis of the following equations (57), (58) and (59).

$$B_{p2}(x_p) = \begin{bmatrix} 0 \\ 0 \\ -(x'_{pw}-x'_{pb})/M_w \\ (x'_{pw}-x'_{pb})/M_b \end{bmatrix} \quad (57)$$

$$D_{p12}(x_p) = \begin{bmatrix} (x'_{pw}-x'_{pb})/M_b \\ 0 \\ 0 \end{bmatrix} \quad (58)$$

$$B_2(x) = \begin{bmatrix} B_{p2}(x_p) \\ B_w D_{p12}(x_p) \\ B_u \end{bmatrix} \quad (59)$$

In the equations (57) and (58), the characters $M_w$, $M_b$ represent the mass of the sprung mass member and the mass of the unsprung mass member of the vehicle, respectively. In the equation (59), the characters $B_w$, $B_u$ represent coefficient matrix related to frequency weights $W_s(s)$, $W_u(s)$ respectively defined by the foregoing equations (20) and (22), which coefficient matrix is preliminarily memorized in the computer 20.

After processing at step 106, the computer 20 calculates at step 108 a state variable $x_w$ of the frequency weights on a basis of the following equation (60).

$$x_w' = A_w x_w + B_w z_p \quad (60)$$

The equation (60) is the same as the foregoing equation (20), wherein the characters $A_w$, $B_w$ represent coefficient matrixes respectively related to the frequency weight $W_s(s)$ defined by the equation (20) and memorized in the computer 20.

Subsequently, the computer 20 calculates at step 110 a state variable $x_u$ of the frequency weight, an extended state amount $x_u$ and a control input u on a basis of the following equations (61), (62) and (63), which are the same as the foregoing equations (22), (27) and (44).

$$x_u' = A_u x_u + B_u u \quad (61)$$

$$x = \begin{bmatrix} x_p \\ x_w \\ x_u \end{bmatrix} \quad (62)$$

$$u = k(x) \quad (63)$$
$$= -D_{122}^{-1}\{(1+m_1(x)x^T C_{11}^T C_{11}x)D_{122}^{-T} B_2^T(x)P + C_{12}\}x$$

In the equation (61), the characters $A_u$, $B_u$ each represent a coefficient matrix related to the frequency weight $W_u(s)$ defined by the foregoing equation (22), which coefficient matrix is memorized as a constant matrix in the computer 20. In the equation (63), the character $D_{122}$ represents a coefficient matrix related to the frequency weight $W_u(s)$ defined by the foregoing equation (34) and determined by the equation (23), which coefficient matrix is memorized as a constant matrix in the computer 20, and the factor $m_1(x)$ represents an arbitrary positive constant function whose algorithm is memorized in the computer 20. The positive constant function $m_1(x)$ may be defined as a positive constant such as "1.0", and the factor $C_{11}$ is defined by the foregoing equations (12) and (31). That is to say, the factor $C_{11}$ is defined by the mass $M_w$ of the unsprung mass member 11, the mass $M_b$ of the sprung mass member 10, the constant $K_s$ of the spring 13, the linear damping coefficient $C_s$ of the damper 14, and the coefficient matrixes $C_w$, $D_w$ related to the frequency weight $W_s(s)$ defined by the equation (21), which factor $C_{11}$ is preliminarily memorized in the computer 20. The factor $B_2(x)$ is a matrix calculated at step 106 of the control program, the character P is a positive definite symmetric solution satisfying the equations (39) and (40), which matrix is preliminarily memorized as a constant matrix in the computer 20. The factor $C_{12}$ represents a constant matrix defined by the equation (33) and including a coefficient matrix $C_u$ related to the frequency weight $W_u(s)$, which constant matrix is memorized in the computer 20.

In calculation of the state variable $X_u$, extended state amount x and control input u at step 110, each value is applied with an initial value, and the equations (60) to (63) are repeatedly calculated to determine the respective values $x_u$, x, u. After processing at step 110, the computer 20 calculates at step 112 a target damping coefficient C of the damper 14 on a basis of the following equation (64).

$$C = C_s + C_v = C_s + u \quad (64)$$

At the following step 114, the computer 20 calculates a target damping force F on a basis of the following equation (65).

$$F = C(x_{pw}' - x_{pb}') \quad (65)$$

where C is the target damping coefficient calculated at step 114, and $x_{pw}'-x_{pb}'$ is the relative velocity calculated by processing at step 104.

Figure 9:
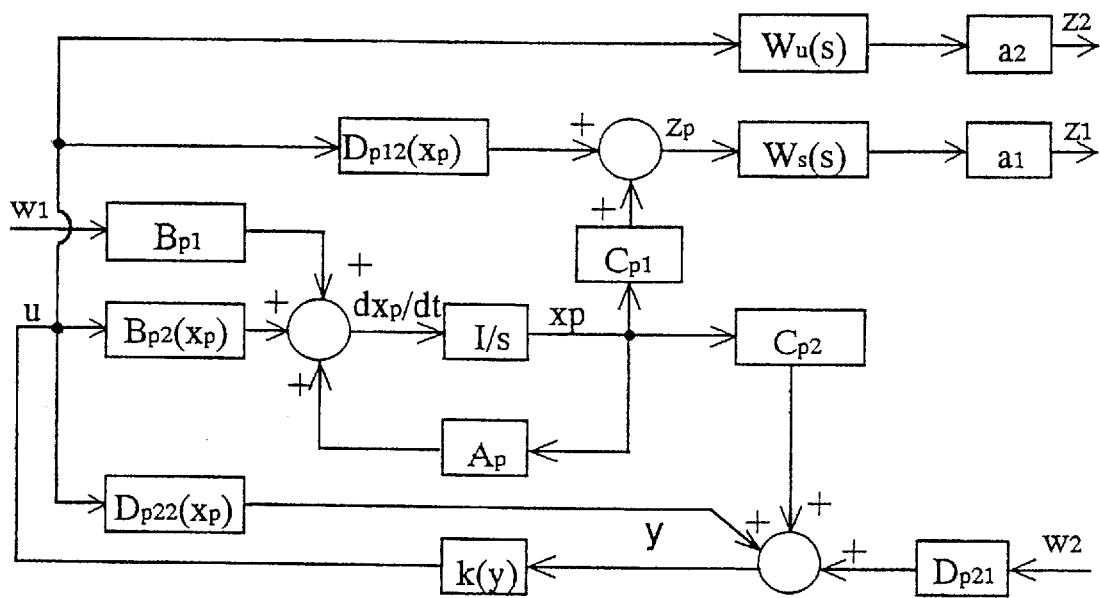
FIG. 9 is a block diagram of a generalized plant of a nonlinear $H_\infty$ output feedback control system in a second embodiment of the present invention.

After processing at step 114, the computer 20 determines at step 116 the opening degree OP of the damper orifice 14a with reference to the relative velocity-damping force table shown in FIG. 8. In this determination, a nearest curve to a point defined by the damping force F and relative velocity $x_{pw}'-x_{pb}'$ in FIG. 8 is retrieved to determine the opening degree OP of damper orifice 14a. Thus, the computer 20 applies a control signal indicative of the determined opening degree OP of damper orifice 14a to the driving circuit 22. In turn, the electric actuator 21 is activated under control of the driving circuit 22 to adjust the damper orifice 14a to the determined opening degree OP. This causes the damper 14 to produce the calculated target damping force F thereby to restrain resonance of the sprung and unsprung mass members 10 and 11 and unpleasant feel to the passengers for enhancing riding, comfort of the vehicle.

c. Second Embodiment:

c1. Design of a Nonlinear $H_\infty$ Output Feedback Control System:

For design of a nonlinear $H_\infty$ output feedback control system, an observer is estimated which includes a portion of the state amount $x_p$ (the tire displacement $x_{pr}-x_{pw}$, relative displacement amount $x_{pw}-x_{pb}$, unsprung mass velocity $x_{pw}'$ and sprung mass acceleration $x_{pb}''$). In this case, a generalized plant of the output feedback control system is estimated as shown in FIG. 9, wherein the frequency weight is added to the evaluation output $z_p$ and the control input u. In the generalized plant, the evaluation output $z_p$ is multiplied by a nonlinear weight function $a_1(x, x\hat{})$ after multiplied by the frequency weight $W_s(s)$, while the control input u is multiplied by a nonlinear weight function $a_2(x, x\hat{})$ after multiplied by the frequency weight $W_u(s)$. Each characteristic of the nonlinear weight functions $a_1(x, x\hat{})$, $a_2(x, x\hat{})$ is represented by the following inequalities (66), (67).

$$a_1(x,x\hat{})>0, a_2(x,x\hat{})>0 \tag{66}$$

$$a_1(o,o)=a_2(o,o)=1 \tag{67}$$

Where $x\hat{}$ represents a state amount including a portion of the estimation value.

Each state space of the control system, the frequency weight $W_s(s)$ related to the evaluation output $z_p$ and the frequency weight $W_u(s)$ related to the control input u is expressed by the following equations (68) to (72) in the same manner as in the state feedback control system described above.

$$x_{p'}=A_p x_p + B_{p1} w_1 + B_{p2}(x_p)u \tag{68}$$

$$x_w' = A_w x_w + B_w z_p \tag{69}$$

$$z_w = C_w x_w + D_w z_p \tag{70}$$

$$x_u' = A_u x_u + B_u u \tag{71}$$

$$z_u = C_u x_u + D_u u \tag{72}$$

In addition, the state variable $x_w$, evaluation function $z_w$, constant matrix $A_w$, $B_w$, $C_w$, $D_w$ are expressed in the same manner as in the state feedback control system described above. Provided that, the state space of the generalized plant in the nonlinear $H_\infty$ output feedback control system is expressed by the following equations (73) to (76).

$$x' = Ax + B_1 w + B_2(x)u \tag{73}$$

$$z_1 = a_1(x,x\hat{})(C_{11}x + D_{121}(x)u) \tag{74}$$

$$z_2 = a_2(x,x\hat{})(C_{12}x + D_{122}u) \tag{75}$$

$$y = C_2 x + D_{21} w + D_{22}(x)u \tag{76}$$

Provided that, x, w, A, $B_1$, $B_2(x)$, $C_{11}$, $D_{121}(x)$, $C_{12}$, $D_{122}$, $C_2$, $D_{21}$, $D_{22}(x)$ in the above equations (73) to (76) are expressed as follows.

$$x = \begin{bmatrix} x_p \\ x_w \\ x_u \end{bmatrix} \tag{77}$$

$$w = \begin{bmatrix} w_1 \\ w_2 \end{bmatrix} \tag{78}$$

$$A = \begin{bmatrix} A_p & 0 & 0 \\ B_w C_{pI} & A_w & 0 \\ 0 & 0 & A_u \end{bmatrix} \tag{79}$$

$$B_1 = \begin{bmatrix} B_{pI} & 0 \\ B_w D_{pII} & 0 \\ 0 & 0 \end{bmatrix} \tag{80}$$

$$B_2(x) = \begin{bmatrix} B_{p2}(x_p) \\ B_w D_{pI2}(x_p) \\ B_u \end{bmatrix} \tag{81}$$

$$C_{11} = [D_w C_{pI} \; C_w \; o] \tag{82}$$

$$D_{121}(x) = [D_w D_{pI2}(x_p)] \tag{83}$$

$$C_{12} = [oo C_u] \tag{83}$$

$$D_{122} = D_u \tag{85}$$

$$C_2 = [C_{p2} oo] \tag{86}$$

$$D_{21} = [o D_{p21}] \tag{87}$$

$$D_{22}(x) = D_{p22}(x_p) \tag{88}$$

To obtain a solution based on the Riccati inequality, the expression of the state space of the generalized plant represented by the foregoing equations (73) to (76) is substituted as follows.

$$D_w D_{p12}(x) = o \tag{89}$$

$$x' = Ax + B_1 w + B_2(x)u \tag{90}$$

$$z_1 = a_1(x,x\hat{}) C_{11} x \tag{91}$$

$$z_2 = a_2(x,x\hat{}) C_{12} x + a_2(x,x\hat{}) D_{122} u \tag{92}$$

$$y = C_2 x + D_{21} w + D_{22}(x) u \tag{93}$$

Similarly, in the state feedback control system, a nonlinear $H_\infty$ output feedback control law $u = k(y)$ is designed in such a manner to satisfy the facts that a closed loop system is stable in internal exponent and that the gain $L_2$ from w to z is less than a positive constant $\gamma$. In this embodiment, three types of nonlinear $H_\infty$ output feedback control systems will be described hereinafter.

c1-1) Design of a First Type Control System:

In the control system of this type, $B_2(x)$ of the equation (81) and $D_{22}(x)$ of the equation (88) each are a measurable known function, and an observer gain L is in the form of a constant matrix.

The foregoing nonlinear $H_\infty$ output feedback control law $u = k(y)$ is obtainable if the following conditions are satisfied.

1) $D_{122}^{-1}$ exists, $\gamma_1$ is a positive constant defined as $\gamma_1^2 I - D_{21}^T \Theta^T \Theta D_{12} > 0$, $\gamma_2$ is defied as $\gamma_2 > 1$, the following Riccati inequality (94) for design of an observer (an observer gain) and a positive definite symmetric matrix P, Q and a positive definite matrix $\Theta$ satisfying the following Riccati inequality (95) for design of a controller are given.

$$AQ + QA^T + Q(C_{11}^T C_{11} + C_{12}^T C_{12} - C_2^T \Theta^T \Theta C_2)Q + B_1(\gamma_1^2 I - D_{21}^T \Theta^T \Theta D_{21})^{-1} B_1^T < 0 \tag{94}$$

$$PA + A^T P + \frac{1}{\gamma_2^2} P L \Theta^{-1} \Theta^{-T} L^T P + \frac{\gamma_2^2}{\gamma_2^2 - 1}(C_{11}^T C_{11} + C_{12}^T C_{12}) < o \tag{95}$$

$$\gamma_2^2 - a_1(x, x\hat{})^2 > 0, \; \gamma_2^2 - a_2(x, x\hat{})^2 > 0 \tag{96}$$

$$\left[\frac{\gamma_2^2}{\gamma_2^2 - 1} - \frac{a_1(x, x\hat{})^2 \gamma_2^2}{\gamma_2^2 - a_1(x, x\hat{})^2}\right]$$

$$x\hat{}^T C_{11}^T C_{11} x\hat{} + \left[\frac{\gamma_2^2 - a_2(x, x\hat{})^2}{a_2(x, x\hat{})^2 \gamma_2^2} - \frac{\gamma_2^2 - 1}{\gamma_2^2}\right]$$

$$xx\hat{}^T P B_2(x) D_{122}^{-1} D_{122}^{-T} B_2^T(x) Px\hat{} \geq 0 \tag{97}$$

$$\left\|\begin{bmatrix} z_1 \\ z_2 \end{bmatrix}\right\|_2 \leq \gamma_1 \gamma_2 \|W\|_2 \tag{98}$$

If the nonlinear weights $a_1(x, x\hat{})$, $a_2(x, x\hat{})$ satisfy the conditions defined by the inequalities (96) and (97), one of control laws defined by the inequality (98) is obtained by the following equations (99) and (100).

$$x\hat{}' = (A + LC_2)X\hat{} + (B_2(x) + LD_{22}(x))u - Lyu = -D_{122}^{-1} \tag{99}$$

$$x\left[\frac{(\gamma_2^2 - a_2(x, x^\wedge))^2}{a_2(x, x^\wedge)^2 \gamma_2^2} D_{122}^{-T} B_2^T(x) P + C_{12}\right] x^\wedge \quad (100)$$

Provided that, the observer gain L is represented as follows.

$$L = -QC_2^T \Theta^T \Theta \quad (101)$$

The character "∥ ∥" represents a Euclidean norm, and "∥ ∥$_2$" represents a norm on a square integrable function space $L_2$ which is defined in relation to f(t)∈$L_2$. by the following equation (102).

$$\|f(t)\|_2 = \left(\int_{t_0}^\infty \|f(t)\|^2 dt\right)^{1/2} \quad (102)$$

The factor Θ is a positive definite matrix under existence of $\Theta^{-1}$, and the observer gain L can be adjusted by using the positive definite matrix Θ. Similarly, in the state feedback control law, the controller gain L can be adjusted by using $D_{122}$. In addition, $\gamma_1$ is a $L_2$ gain of the observer, and $\gamma_2$ is a $L_2$ gain of the controller. A gain $L_2$ of the closed loop system is determined by product of $\gamma_1$ and $\gamma_2$. Accordingly, the $L_2$ gains of the control system must be determined by adjustment of the observer and controller.

Here, the nonlinear weights $a_1(x, x^\wedge)$, $a_2(x, x^\wedge)$ satisfying the formulae (96) and (97) are expressed as follows.

$$a_1(x, x^\wedge) = (\gamma_2^2 + (\gamma_2^2 - 1)\gamma_2^2 \varepsilon m_1(x, x^\wedge) x^{\wedge T} \times \quad (103)$$
$$PB_2(x) D_{122}^{-1} D_{122}^{-T} B_2^T(x) P x^\wedge)^{1/2} /$$
$$(\gamma_2^2 + (\gamma_2^2 - 1) m_1(x, x^\wedge) x^{\wedge T} \times$$
$$PB_2(x) D_{122}^{-1} D_{122}^{-T} B_2^T(x) P x^\wedge)^1$$

$$a_2(x, x^\wedge) = \sqrt{\frac{1}{1 + m_1(x, x^\wedge) x^{\wedge T} C_{11}^T C_{11} x^\wedge}} \quad (104)$$

In the equations (103) and (104), $m_1(x, x^\wedge)$ is an appropriated positive definite function, $\varepsilon$ is a positive constant defined as $\varepsilon < 1$ and $\varepsilon \gamma_2^2 > 1$. Thus, the foregoing positive definite symmetric solution P is calculated by the computer 20. Using the equations (103) and (104), the equations (99) and (100) are converted into the following equations (105) and (106).

$$x'^\wedge = (A + LC_2) x^\wedge + (B_2(x) + LD_{22}(x)) u - Ly u = -D_{122}^{-1} \quad (105)$$

$$x\left[\frac{\gamma_2^2 - 1 + \gamma_2^2 m_1(x, x^\wedge) x^{\wedge T} C_{11}^T C_{11} x^\wedge}{\gamma_2^2} x D_{122}^{-T} B_2^T(x) P + C_{12}\right] x^\wedge x^\wedge \quad (106)$$

In this case, the positive definite symmetric solution can be obtained in a simple manner using a conventional software, similarly in the state feedback control system. With this method, an estimated state amount $x'^\wedge$ and control law u=k (y) can be also derived in a simple manner.

c1-2) Practical Embodiment of a Damping Force Control system in a Wheeled Vehicle on a Basis of the First Type Control Law.

Figure 10:
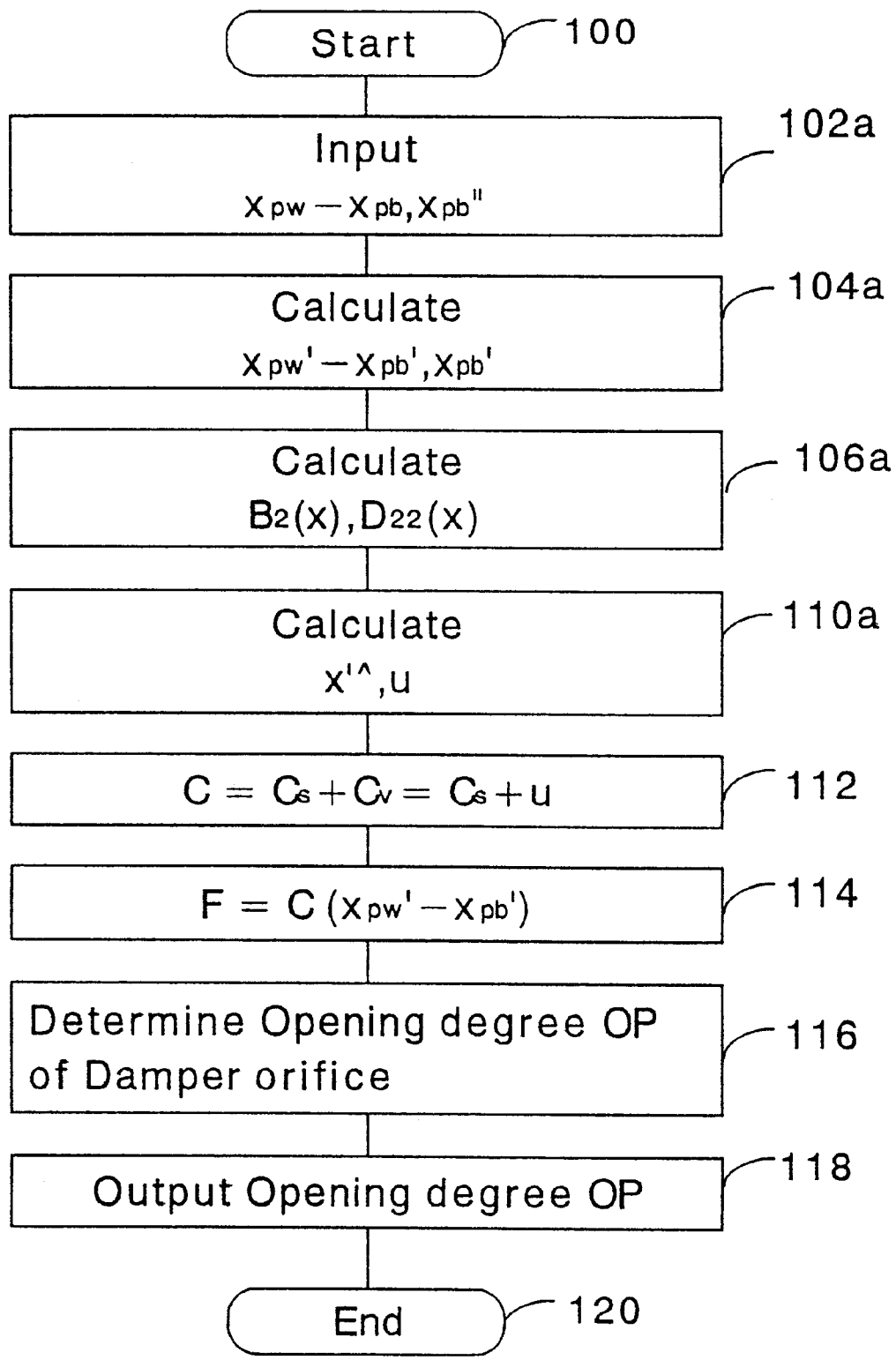
FIG. 10 is a flow chart of a control program executed by the microcomputer of FIG. 6 in the second embodiment.

In this embodiment, the damping force control system is constructed as shown in FIG. 6, without the provision of the tire displacement amount sensor 23 and unsprung mass acceleration sensor 26, and the microcomputer 20 is arranged to execute a control program shown by a flow chart in FIG. 10. The other construction and components of the control system are substantially the same as those in the damping force control system in the first embodiment.

In operation of the control system, the computer 20 starts at step 100 to repeat execution of the control program at each lapse of the predetermined short time and inputs at step 102a detection signals respectively indicative of a relative displacement amount $x_{pw} - x_{pb}$ of the sprung mass to the unsprung mass and acceleration $x_{pb}''$ of the sprung mass from the stroke sensor 24 and sprung mass acceleration sensor 25. Thus, the computer 20 calculates at step 104a a relative velocity $x_{pw}' - x_{pb}'$ of the sprung mass to the unsprung mass and a vertical velocity $x_{pb}'$ of the sprung mass in the same manner as in the first embodiment.

At the following step 106a, the computer 20 calculates $B_{p2}(x_p)$, $D_{p12(xp)}$ based on the following equations (107) and (108) and calculates $B_2(x)$ based on the following equation (109). Additionally, the computer 20 calculates $D_{22}(x)$ based the following equations (110) and (111).

$$B_{p2}(x_p) = \begin{bmatrix} 0 \\ 0 \\ -(x_{pw}' - x_{pb}')/M_w \\ (x_{pw}' - x_{pb}')/M_b \end{bmatrix} \quad (107)$$

$$D_{p12}(x_p) = \begin{bmatrix} (x_{pw}' - x_{pb}')/M_b \\ 0 \\ 0 \end{bmatrix} \quad (108)$$

$$B_2(x) = \begin{bmatrix} B_{p2}(x_p) \\ B_w D_{p12}(x_p) \\ B_u \end{bmatrix} \quad (109)$$

$$D_{p22}(x_p) = \begin{bmatrix} (x_{pw}' - x_{pb}')/M_b \\ 0 \end{bmatrix} \quad (110)$$

$$D_{22}(x) = D_{p22}(x_p) \quad (111)$$

In the equations (107) to (110), $M_w$, $M_b$, $B_w$, $B_u$ each represent a constant matrix of the same value as that in the first embodiment.

After processing at 106a, the computer 20 calculates at step 110a an estimated state amount $x^\wedge$ and a control input u based on the following equations (112) and 113) in the same manner as in the first embodiment.

$$x'^\wedge = (A + LC_2) x^\wedge + (B_2(x) + LD_{22}(x)) u - Ly \quad (112)$$

$$u = -D_{122}^{-1} \quad (113)$$

$$x\left[\frac{\gamma_2^2 - 1 + \gamma_2^2 m_1(x, x^\wedge) x^{\wedge T} C_{11}^T C_{11} x^\wedge}{\gamma_2^2} x D_{122}^{-T} B_2^T(x) P + C_{12}\right] x^\wedge x^\wedge$$

In the equation (112), A is a constant matrix determined by the foregoing equation (79) which is memorized in the computer 20, and L is a constant matrix defined by the foregoing equation (101) which is memorized in the computer 20. The constant matrix L is a gain of an observer determined by a positive definite matrix Q, the constant matrix $C_2$ determined by the foregoing equations (14), (86) and a positive definite matrix Θ. $C_2$ is the foregoing constant matrix memorized in the computer 20, and $B_2(x)$ and $D_{22}(x)$ each are a matrix calculated at step 106a. The factor y represents the relative displacement amount $x_{pw}-x_{pb}$ applied by processing at step 102a and a sprung mass velocity $x_{pb}{}'$ calculated by processing at step 104a.

In the equation (113), $D_{122}$ is defined by the equation (85) and is a coefficient matrix related to the frequency weight $W_u(s)$ defined by the equation (23), which coefficient matrix is memorized in the computer 20. $\gamma_2$ is a positive constant defined as $\gamma_2 > 1$, $m_1(x, x\hat{\,})$ is an appropriated positive constant function whose algorithm is preliminarily memorized in the computer 20. The positive constant function $m_1(x)$ may be set as "1.0". $C_{11}$ is defined by the foregoing equations (12) and (82). That is to say, $C_{11}$ is defined by the mass $M_w$ of the unsprung mass member, the mass $M_b$ of the sprung mass member, the constant $K_s$ of the spring 13, the linear damping coefficient $C_s$ of damper 14 and the coefficient matrixes $C_w$, $D_w$ related to the frequency weight $W_s(s)$ determined by the foregoing equation (21), which $C_{11}$ is preliminarily memorized as a constant matrix in the computer 20. $B_2(x)$ is a matrix calculated by processing at step 106a. P is a positive definite symmetric solution satisfying the foregoing equations (94) and (95), which is memorized as a constant matrix in the computer 20. $C_{12}$ is defined by the foregoing equation (84), which is memorized in the computer 20 as a constant matrix including a coefficient matrix $C_u$ related to the frequency weight $W_u(s)$ determined by the foregoing equation (23).

After processing at step 110a, the computer 20 calculates at step 112 to 118 a target damping coefficient C of the damper 14 and a target damping force F in the same manner as in the first embodiment and determines the opening degree OP of damper orifice 14a to produce the target damping force F. Thus, the damper 14 is adjusted in a simple manner to produce the target damping force F without detection of the unsprung mass velocity $x_{pw}{}'$ and tire displacement amount $x_{pr}-x_{pw}$.

c2-1) Design for the Second Type Control System:

In the control system of this type, it is assumed that $B_2(x)$ and $D_{22}(x)$ in the foregoing equations (81) and (88) each are an unknown function. In a bilinear system of this kind, $B_2(x)$, $D_{22}(x)$ each are a primary Junction of x. When the generalized plant represented by the foregoing equations (90) to (93) is rewritten taking into account the above fact, the plant is represented by the following equations (114) to (117), wherein $B_{20}$, $D_{220}$ and $d_{122}$ each are in the form of a constant matrix.

$$x' = Ax + B_1 w + B_{20} xu \tag{114}$$

$$z_1 = a_1(x\hat{\,})C_{11}x \tag{115}$$

$$z_2 = a_2(x\hat{\,})C_{12}x + a_2(x)d_{122}u \tag{116}$$

$$y = C_2 x + D_{21} w + D_{220} xu \tag{117}$$

Assuming that the observer gain L is a constant matrix in the generalized plant as described above, a nonlinear $H_\infty$ output feedback control law can be designed as follows.

1) In the case that $\gamma_1$ is a positive constant defined as $\gamma_1^2 I - D_{21}{}^T \Theta^T \Theta D_{12} > 0$, $\gamma_2$ is a positive constant defined as $\gamma_2 > 1$ and a positive constants $\epsilon$ is defined as a $\epsilon_1{}^2 - u^2 > 0$, the following Riccati inequality (118) for design of the observer (the observer gain) is given, and a positive definite symmetric matrix P, Q and a positive definite matrix $\Theta$ satisfying the following Riccati inequality (11) for design of a controller are given. In addition, in the case that nonlinear weights $a_1(x, x\hat{\,})$, $a_2(x, x\hat{\,})$ satisfy the condition for restriction defined by the following equations (120) and (121), one of control laws defined by the following equation (122) is given by the following equations (123) and (124).

$$AQ + QA^T + Q(C_{11}^T C_{11} + C_{12}^T C_{12} - C_2^T \Theta^T \Theta C_2 + \varepsilon^2 I + \tag{118}$$
$$\varepsilon_1^2 D_{220}^T \Theta^T (I + \Theta D_{21} \times (\gamma_1^2 I - D_{21}^T \Theta^T \Theta D_{21})^{-1} D_{21}^T \Theta^T)$$
$$\Theta D_{220})Q + B_1(\gamma_1^2 I - D_{21}^T \Theta^T \Theta D_{21})^{-1} B_1^T +$$
$$(B_1(\gamma_1^2 I - D_{21}^T \Theta^T \Theta D_{21})^{-1} D_{21}^T \Theta^T \Theta D_{220} + B_{20}) \times$$
$$(D_{220}^T \Theta^T \Theta D_{21}(\gamma_1^2 I - D_{21}^T \Theta^T \Theta D_{21})^{-1} B_1^T + B_{20}^T) < 0$$

$$PA + A^T P + \frac{1}{\gamma_2^2} P L \Theta^{-1} \Theta^{-T} L^T P + \frac{\gamma_2^2}{\gamma_2^2 - 1}(C_{11}^T C_{11} + C_{12}^T C_{12}) < 0 \tag{119}$$

$$\gamma_2{}^2 - a_1(x,x\hat{\,})^2 > 0, \gamma_2{}^2 - a_2(x,x\hat{\,})^2 > 0 \tag{120}$$

$$\left[\frac{\gamma_2^2}{\gamma_2^2 - 1} - \frac{a_1(x, x\hat{\,})^2 \gamma_2^2}{\gamma^2 - a_1(x, x\hat{\,})^2}\right] x\hat{\,}^T C_{11}^T C_{11} \tag{121}$$

$$x\hat{\,} + \left[\frac{\gamma_2^2 - a_2(x, x\hat{\,})^2}{a_2(x, x\hat{\,})^2 \gamma_2^2} - \frac{\gamma_2^2 - 1}{\gamma_2^2}\right] \frac{1}{d_{122}^2} x x\hat{\,}^T P B_{20} x\hat{\,} x\hat{\,}^T B_{20}^T P x\hat{\,} \geq 0$$

$$\|[z_1^T z_2^T]^T\|_2 \leq \gamma_1 \gamma_2 \|w\|_2 \tag{122}$$

$$x\hat{\,}' = (A + L(L(u)C_2)x\hat{\,} + (B_{20} + L(u)D_{220})x\hat{\,}u - L(u)y \tag{123}$$

$$u = -\frac{1}{d_{122}}\left[\frac{\gamma_2^2 - a_2(x, x\hat{\,})^2}{a_2(x, x\hat{\,})^2 \gamma_2^2 d_{122}} x\hat{\,}^T B_{20}^T P + C_{12}\right] x\hat{\,} \tag{124}$$

Provided that, the observer L(u) is represented as follows.

$$L(u) = -QC_2^T \Theta^T \Theta \tag{125}$$

The factor $\Theta$ is a constant definite matrix under existence of $\Theta^{-1}$, and the observer can be adjusted by using the factor $\Theta$. Similarly, in the state feedback control law, the gain L of the controller can be adjusted by using the factor $d_{122}$.

Here, the nonlinear weights $a_1(x, x\hat{\,})$, $a_2(x, x\hat{\,})$ satisfying the formulae (120) and (121) is expressed as follows.

$$a_1(x, x\hat{\,}) = (\gamma_2^2 d_{122}^2 + (\gamma_2^2 - 1)\gamma_2^2 \varepsilon m_1(x, x\hat{\,}) \times \tag{126}$$
$$x\hat{\,}^T P B_{20} x\hat{\,} x\hat{\,}^T B_{20}^T P x\hat{\,})^{1/2} /$$
$$(\gamma_2^2 d_{122}^2 + (\gamma_2^2 - 1)m_1(x, x\hat{\,}) \times$$
$$x\hat{\,}^T P B_{20} x\hat{\,} x\hat{\,}^T B_{20}^T P x\hat{\,})^{1/2}$$

$$a_2(x, x\hat{\,}) = \sqrt{\frac{1}{1 + m_1(x, x\hat{\,})x\hat{\,}^T C_{11}^T C_{11} x\hat{\,}}} \tag{127}$$

In the equations (126) and (127), $m_1(x, x\hat{\,})$ is an appropriated positive definite function, and $\epsilon$ is a positive constant defined as $\epsilon < 1$, $\epsilon \gamma_2{}^2 > 1$. Thus, the positive definite symmetric solution P is calculated by the computer 20. Using the equations (126) and (127), the foregoing equations (123) and (124) are converted into the following equations (128) and (129).

$$x\hat{\,}' = (A + L(u)C_2)x\hat{\,} + (B_{20} + L(u)D_{220})x\hat{\,}u - L(u)y \tag{128}$$

$$u = -\frac{1}{d_{122}}\left[\frac{\gamma_2^2 - 1 + \gamma_2^2 m_1(x, x\hat{)} x\hat{^T} C_{11}^T C_{11} x\hat{}}{d_{122}\gamma_2^2} x B_{20}^T P + C_{12} x\hat{}\right] \quad (129)$$

In this case, the positive definite symmetric solution is obtained in a simple manner using a conventional software, similarly in the state feedback control system. With this method, an estimated state amount x'^ and the control law u=k (y) can be also derived in a simple manner.

c2-2) Practical Embodiment of a Damping Force Control System in a Wheeled Vehicle on a Basis of the Second Type Control Law:

In this embodiment, a damping force control system based the second type control law is constructed as shown in FIG. 6, without the provision of the stroke sensor 24, and the microcomputer 20 is arranged to execute the control program shown in FIG. 10 without calculating the relative displacement amount $x_{pw}-x_{pb}$ and relative velocity $x_{pw}'-x_{pb}'$ applied from the stroke sensor 24 and executing the processing at step 106a.

In operation of the control system, the computer 20 repeats execution of the control program at each lapse of the predetermined short time and inputs at step 102a a sprung mass acceleration $x_{pb}''$ to calculate a sprung mass Velocity $x_{pb}'$ at step 104a. At the reflowing step 110a, the computer 20 calculates an estimated state amount x'^ and a control input u on a basis of the following equations (130) and (131).

$$x'\hat{} = (A+L(u)C_2)x\hat{} + (B_2+L(u)D_{220})x\hat{}u - L(u)y \quad (130)$$

$$u = -\frac{1}{d_{122}}\left[\frac{\gamma_2^2 - 1 + \gamma_2^2 m_1(x, x\hat{)} x\hat{^T} C_{11}^T C_{11} x\hat{}}{d_{122}\gamma_2^2} x B_{20}^T P + C_{12} x\hat{}\right] \quad (131)$$

In the equations (130) and (131), A, L, $C_2$, $\gamma_2$, $m_1(x, x\hat{)}$, $C_{11}$, P, $C_{12}$ are the same as those in the first type control system, and $B_{20}$, $D_{220}$, $d_{122}$ each are an appropriate constant matrix preliminarly memorized in the computer 20. In this case, the value y represents a sprung mass velocity $x_{pb}'$ calculated by processing at step 104a.

After processing at step 110a, the computer 20 calculates a target damping coefficient C and a target damping force F of the damper 14 by processing at step 112 and 114. In this instance, the target damping force F is calculated on a basis of the estimated relative velocity $x_{pw}'-x_{pb}'$ calculated by processing at step 10a. Subsequently, the computer 20 determines at step 116 and 118 the opening degree OP of the damper orifice 14a to produce the target damping force F. Anus, the damper 14 is adjusted in a simple manner to produce the target damping force F without detection of the relative displacement amount $x_{pw}-x_{pb}$.

c3-1) Design of a Control System of the Third Type:

In the control system of this type, $B_2(x)$ and $D_{22}(x)$ in the foregoing equations (81) and (88) each are a unknown function, and an observer gain L is a function matrix as in the second type control system.

Assuming that the observe gain L is a function of the control input, a nonlinear $H_\infty$ output feedback control law for the generalized plant represented by the equations (114) and (117) of the second type is designed under the following conditions.

1) In the case that $\gamma_1$ is a positive constant defined as $\gamma_{12}I - D_{21}{}^T\Theta^T\Theta D_{12} > 0$, $\gamma_2$ is a positive constant defined as $\gamma_2 > I$ and a positive constant $\epsilon$ is defined as $\epsilon_1{}^2 - u^2 > 0$, the following Riccati inequality (132) for design of an observer (an observer gain) is given, and a positive definite symmetric matrix P, Q and a positive definite matrix $\Theta$ satisfying the following Riccati inequality (132) for design of a controller are given.

2) In addition, in the case that nonlinear weights $a_1(x, x\hat{)}$, $a_2(x, x\hat{)}$ satisfy the condition for restriction defined by the following equations (134) and (135), one of control laws defined by the following equation (136) is given by the following equations (137) and (138).

$$AQ + QA^T + Q(C_{11}{}^T C_{11} + C_{12}{}^T C_{12} - \epsilon^2 I)Q + B_1(\gamma_1{}^2 I - D_{21}{}^T\Theta^T\Theta D_{21})^{-1}B_1{}^T + B_{20}B_{20}{}^T < 0 \quad (132)$$

$$PA + A^T P + \frac{1}{\gamma_2^2}PL_1\Theta^{-1}\Theta^{-T}L_1^T P + \frac{\epsilon_1^2 d_{122}^2}{\gamma_2^2}PL_2\Theta^{-1}\Theta^{-T}L_2^T P + \frac{\gamma_2^2}{\gamma_2^2 - 1}(C_{11}^T C_{11} + C_{12}^T C_{12}) < o \quad (133)$$

$$\gamma_2^2 - a_1(x,x\hat{)}^2 > 0, \gamma_2^2 - a_2(x,x\hat{)}^2 > 0 \quad (134)$$

$$\left[\frac{\gamma_2^2 - a_2(x, x\hat{)}^2}{a_2(x, x\hat{)}^2\gamma_2^2} - \frac{\gamma_2^2 - 1}{\gamma_2^2}\right]\frac{1}{d_{122}^2}x\hat{^T}Px(B_{20} + L_1\Theta^{-1}\Theta^{-T}L_2^T P) \quad (135)$$

$$x\hat{} + \left[\frac{\gamma_2^2}{\gamma_2^2 - 1} - \frac{a_1(x, x\hat{)}^2\gamma_2^2}{\gamma_2^2 - a_1(x, x\hat{)}^2}\right]x\hat{^T}C_{11}^T C_{11}x\hat{} \geq 0$$

$$\|[z_1{}^T z_2{}^T]T\|_2 \leq \gamma_1\gamma_2\|w\|_2 \quad (136)$$

$$x'\hat{} = (A+L_1 C_2)x\hat{} + (B_{20}+L_2 D_{220})x\hat{}u - (L_1+L_2u)y \quad (137)$$

$$u = \quad (138)$$

$$-\frac{1}{d_{122}}\left[\frac{\gamma_2^2 - a_2(x, x\hat{)}^2}{a_2(x, x\hat{)}^2\gamma_2^2 d_{122}}x\hat{^T}x\left(B_{20}^T P + \frac{1}{\gamma^2}PL_1\Theta^{-1}\Theta^{-T}L_2^T P\right) + C_{12}\right]x\hat{}$$

Provided that, the observer gain L (u) is represented as follows.

$$L(u) = -QC_2{}^T\Theta^T\Theta - uQD_{220}{}^T\Theta^T\Theta = L_1 + uL_2 \quad (139)$$

In the equation (139), $L_1$, $L_2$ are represented by the following equations (140) and (141).

$$L_1 = -QC_2{}^T\Theta^T\Theta \quad (140)$$

$$L_2 = -QD_{220}{}^T\Theta^T\Theta \quad (141)$$

The factor $\Theta$ is a constant definite matrix under existence of $\Theta^{-1}$, and the observer can be adjusted by the factor $\Theta$. Similarly, in the state feedback control law, the gain L of the controller can be adjusted by the factor $d_{122}$.

Here, the nonlinear weights $a_1(x, x\hat{)}$, $a_2(x, x\hat{)}$ satisfying the formulae (134) and (135) are expressed as follows.

$$a_1(x, x\hat{)} = (\gamma_2^2 d_{122}^2 + (\gamma_2^2 - 1)\gamma_2^2\epsilon m_1(x, x\hat{)} x\hat{^T}P\times \quad (142)$$

$$(B_{20} + L_1\Theta^{-1}\Theta^{-T}L_2^T P)x\hat{} x\hat{^T} \times$$

$$(B_{20}^T + PL_2\Theta^{-1}\Theta^{-T}L_1^T)Px\hat{)}^{1/2} /$$

$$(\gamma_2^2 d_{122}^2 + (\gamma_2^2 - 1)m_1(x, x\hat{)} x\hat{^T}P\times$$

$$(B_{20} + L_1\Theta^{-1}\Theta^{-T}L_2^T P)x\hat{} x\hat{^T} \times$$

$$(B_{20}^T + PL_2\Theta^{-1}\Theta^{-T}L_1^T)Px\hat{)}^{1/2}$$

$$a_2(x, x\hat{\,}) = \sqrt{\frac{1}{1 + m_1(x, x\hat{\,})x\hat{\,}^T C_{11}^T C_{11} x\hat{\,}}} \tag{143}$$

In the equations (142) and (143), m1(x, x^) is an appropriated positive definite function, and $\epsilon$ is a positive constant defined as $\epsilon<1$, $\epsilon\gamma_2^2>1$. Thus, the positive definite symmetric solution P is calculated by the computer 20. Using the equations (142) and (143), the foregoing equations (137) and (138) are converted into the following equations (144) and (145).

$$x'\hat{\,} = (A + L_1 C_2)x\hat{\,} + (B_2 x\hat{\,} + L_2 D_{22} x\hat{\,})u - L(u)y \tag{144}$$

$$u = -\frac{\gamma_2^2 - 1 + \gamma_2^2 m_1(x, x\hat{\,}) x\hat{\,}^T C_{11}^T C_{11} x\hat{\,}}{d_{122}^2 \gamma_2^2} \tag{145}$$

$$x\left(B_{20}^T + \frac{1}{\gamma_2^2} PL_1 \Theta^{-1} \Theta^{-T} L_2^T\right) Px\hat{\,} - \frac{1}{d_{122}} C_{12} x\hat{\,}$$

In this case, the positive definite symmetric solution P is obtained in a simple manner using a conventional software, similarly in the state feedback control system. With this method, an estimated state amount x'^ and the control law u=k (y) can be also derived in a simple manner.

c3-2) Practical Embodiment of a Damping Force Control System in a Wheeled Vehicle on a Basis of the Third Type Control Law:

In this embodiment, a damping force control system based on the third type control law is the same in construction as the control system based on the second type control law.

In operation of the control system, the computer 20 repeats execution of the control program of FIG. 10 at each lapse of the predetermined short time. After processing at 102a and 104a, the computer 20 calculates an estimated state amount x'^ and a control input u on a basis of the following equations (146) and (147).

$$x'\hat{\,} = (A + L_1 C_2)x\hat{\,} + (B_2 x\hat{\,} + L_2 D_{22} x\hat{\,})u - L(u)y \tag{146}$$

$$u = -\frac{\gamma_2^2 - 1 + \gamma_2^2 m_1(x, x\hat{\,}) x\hat{\,}^T C_{11}^T C_{11} x\hat{\,}}{d_{122}^2 \gamma_2^2} \tag{147}$$

$$x\left(B_{20}^T + \frac{1}{\gamma_2^2} PL_1 \Theta^{-1} \Theta^{-T} L_2^T\right) Px\hat{\,} - \frac{1}{d_{122}} C_{12} x\hat{\,}$$

In the equations (146) and (147), A, $C_2$, B20, D220, $\gamma_2$, $m_1(x, x\hat{\,})$, $C_{11}$, $d_{122}$, P, $C_{12}$ are the same as those in the second type control system, and L, $L_1$, $L_2$ each are a gain defined by the foregoing equations (139) to (141). In addition, the value y represents the sprung mass velocity $x_{pb}'$ calculated by processing at step 104a.

After processing at step 110a, the computer 20 calculates an overall target damping coefficient C and a target damping force F of the damper 14 by processing at step 112 and 118. Thus, the computer 20 determines the opening degree OP of the damper orifice 14a to produce the target damping force F, and the damper 14 is adjusted in a simple manner to produce the target damping force F without detection of the relative displacement amount $x_{pw} - x_{pb}$ as in the second type control system.

d. Third Embodiment:

d1. Design of a Nonlinear $H_\infty$ Control System of the Kalman Filter Base:

An output feedback system with a Kalman filter used in an observer is designed in a condition where the bilinear factors $B_{p2}(x_p)$, $D_{p2}(x_p)$ are known. In this embodiment, the same reference characters as those in the second embodiment represent the same factors as those in the second embodiment, and the coefficients aid variables related to a plant are suffixed with "p". The state space of the suspension mechanism is expressed by the following equations (148) and (149).

$$x_p' = A_p x_p + B_{p1} w_1 + B_{p2}(x_p) u \tag{148}$$

$$y_p = C_p x_p + D_{p1} w_2 + D_{p2}(x_p) u \tag{149}$$

In the case that $D_{p1}$ is defined as $d_{p1}=I$, the Kalman filter in the case of t→∞ is represented by the following equation.

$$x_o' = A_p x_o + B_{p2} u + K(C_p x_o + D_{p2}(x_p)u - y) \tag{150}$$

Provided that, $x_o$, $x_o'$ each are an estimated state amount in the Kalman filter. The gain of the Kalman filter is defined by the following equation (151).

$$K = -\Sigma C_p^T W^{-1} \tag{151}$$

where the estimated error covariance $\Sigma$ is a positive symmetric solution of the following Riccati equation (152).

$$A_p \Sigma + \Sigma A_p^T + B_{p1} V B_{p1}^T - \Sigma C_p^T W^{-1} C_p \Sigma = O \tag{152}$$

where V is a covariance matrix of $w_1$, and W is a covariance matrix of $w_2$.

Figure 11:
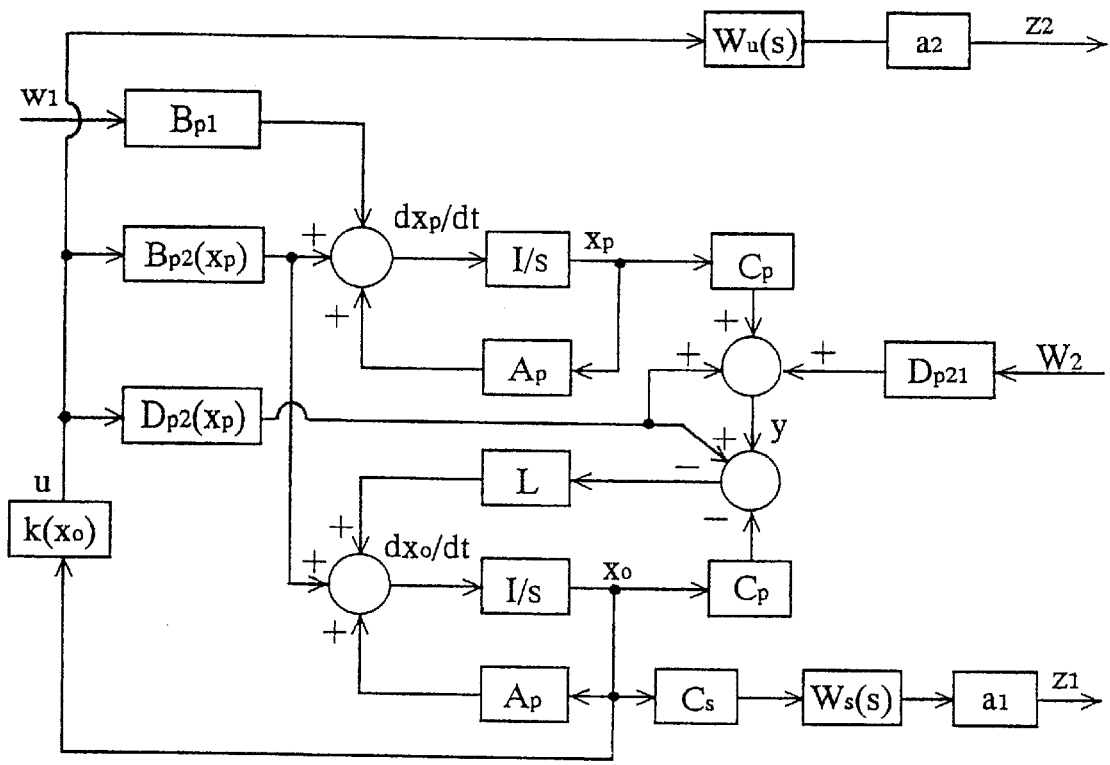
FIG. 11 is a block diagram of a generalized plant of a nonlinear $H_\infty$ output feedback control system of the Kalman filter base.

Illustrated in FIG. 1 is a block diagram of a generalized plant of the system in which an estimated state amount $x_o$ multiplied by a frequency weight Ws (s) and a control input u multiplied by a frequency weight $W_u(s)$ are used as an evaluation output z. That is to say, the Kalman filter is used as a detector in such a manner that the output of the Kalman filter decreases in the control system. Although the control system is different from the first and second embodiments in this point, the same performance as that of the first and second embodiments is obtainable if the state estimation is made in an appropriate manner. The state space of the control system shown iin FIG. 11 is expressed as follows.

$$x_{p'} = A_p x_p + B_{p1} w_1 + B_{p2}(x_p) u \tag{153}$$

$$x_o' = A_p x_o + B_{p2}(x_p)u + L(C_2 x_o + D_{p2}(x_p)u - y) \tag{154}$$

$$y = C_p x_p + D p_{p1} w_2 + D_{p2}(x_p) u \tag{155}$$

$$x_w' = A_w x_w + B_w C_s x_o \tag{156}$$

$$z_1 = a_1(x_p, x_o, x_w, x_u)(C_w x_w + D_w C_s x_o) \tag{157}$$

$$x_u' = A_u x_u + B_u u \tag{158}$$

$$z_2 = a_2(x_p, x_o, x_w, x_u)(C_u x_u + D_u u) \tag{159}$$

Provided that, $x_p$ is a state amount of the system, the equation (153) is an expression of the state space of the system, $x_o$ is an estimated state amount, the equation (154) is an expression of the state space of the observer, the value y is a measured output, and the value $x_w$ is a state of the frequency weight. Evaluation outputs $z_1$, $z_2$ are multiplied by a nonlinear weight designed later.

In the control system, a control law u=k ($x_o$) is designed for control of a state of the observer wherein a closed loop system is stable in internal exponent and an $L_2$ gain from w to z is less than a positive constant γ. This control system is characterized by an input $x_o$ to the frequency weight $W_s(s)$ as represented by the following equation (160).

$$x_w' = A_w x_w + B_w C_s x_o$$

$W_s(s)$:

$$z_1 = C_w x_w + D_w C_s x_o \quad (160)$$

In the case that an error variable is defined by the following equation (161), an error system is represented by the following equations (162) and (163).

$$x_e = x_p - x_o \quad (161)$$

$$x_e' = (A_p + LC_p)x_e + B_{p1}w_1 + LD_p w_2 \quad (162)$$

$$y_e - y = C_p x_o - D_{p2}(x_p)u = C_p x_e + D_{p1}w_2 \quad (163)$$

The equations (162) and (163) are converted into the following equations (164) and (165) by multiplying the factor y by a constant matrix (a scaling matrix) including a reverse matrix.

$$x_{pe}' = (A_p + LC_p)x_{pe} + B_{p1}w_1 + LD_p w_2 \quad (164)$$

$$y_e^- = \Theta C_p x_e + \Theta D_{p1} w_2 \quad (165)$$

For the converted error system, an observer gain L is designed in such a manner that an $L_2$ gain of from an external disturbance input $w = [w_1^T w_2^T]$ to $y_e^-$ under existence of a positive constant $\gamma_1$ becomes $\gamma_1(\|y_e^-\|_2 \leq \gamma_1 \|w\|_2)$.

In case $\gamma_1$ is a positive constant satisfying $\gamma_1 I - D_{p1}^T \Theta^T \Theta D_{p1} > 0$, the gain L of $\|y_e^-\|_2 \leq \gamma_1 \|w\|_2$ is represented by the following equation (166).

$$L = -QC_p^T \Theta^T \Theta \quad (166)$$

Provided that, Q is a positive definite symmetric matrix satisfying the following Riccati equation (167).

$$A_p Q + Q A_p^T + \frac{1}{\gamma_1} B_{p1} B_{p1}^T - QC_p^T \Theta^T \Theta C_p Q = o \quad (167)$$

In this case, it is to be noted that the Riccati equation (167) is an order of the plant which is smaller than that of the generalized plants in the first and second embodiments.

Subsequently, the equation (154) related to the plant is rewritten as follows.

$$x_o' = Ax_o + B_2(x_p)u + L(C_2 x_o + D_{p2}(x_p)u - y = Ax_o + B_2(x_p)u + L\Theta^{-1}y_e \quad (168)$$

Using an observer represented by the equation (168), a controller is designed in such a manner that an $L_2$ gain of from an observer error $y_e^{\wedge}$ to an evaluation output z under existence of a positive constant $\gamma_2$ becomes less than $\gamma_2(\|z\|_2 \|y_e^-\|_2)$. Here, in the case that the observer is used to provide a generalized plant in comply with a state variable $x_w$, $x_u$, the state space of the plant is represented by the following equations (169) to (171).

$$x_k' = Ax_k + B_2(x_p)u + L_1 \Theta^{-1} y_e^- \quad (169)$$

$$z_1 = a_1(x_p, x_k) C_{11} x_k \quad (170)$$

$$z_2 = a_2(x_p, x_k) C_{12} x_k + a_2(x_p, x_k) D_{12} u \quad (171)$$

Provided that, each variable matrix and constant matrix in the equations (169) to (171) are represented by the following equations (172) to (179).

$$x_k = \begin{bmatrix} x_0 \\ x_w \\ x_u \end{bmatrix} \quad (172)$$

$$A = \begin{bmatrix} A_p & o & o \\ B_w C_s & A_w & o \\ o & o & A_u \end{bmatrix} \quad (173)$$

$$B_2(x_p) = \begin{bmatrix} B_{p2}(x_p) \\ 0 \\ B_u \end{bmatrix} \quad (174)$$

$$L_1 = \begin{bmatrix} L \\ 0 \\ 0 \end{bmatrix} \quad (175)$$

$$z = \begin{bmatrix} z_1 \\ z_2 \end{bmatrix} \quad (176)$$

$$C_{11} = [D_w C_s C_w 0] \quad (177)$$

$$C_{12} = [oo C_u] \quad (178)$$

$$D_{12} = D_u \quad (179)$$

The state amount $x_k$ defined above does not include a state amount $x_p$.

If there exists $D_{12}^{-1}$, a positive definite symmetric solution P of the following Riccati inequality (180) is obtainable. When the nonlinear weights $a_1(x_p, x_k)$, $a_2(x_p, x_k)$ satisfy the following equation (181), the controller is given by the following equation (182).

$$PA + A^T P + \frac{PL\Theta^{-1}\Theta^{-T}L^T P}{\gamma_2^2} + C_{11}^T C_{11} + C_{12}^T C_{12} < o \quad (180)$$

$$(1 - a_1(x_p, x_k)^2) x_k^T C_{11}^T C_{11} \quad (181)$$

$$x_k + \left[ \frac{1}{a_2(x_p, x_k)^2} - 1 \right] \times x_k^T P B_2(x_p) D_{12}^{-1} D_{12}^{-T} B_2^T(x_p) P x_k \geq 0$$

$$u = -D_{12}^{-1} \left[ \frac{1}{a_2(x_p, x_k)^2} D_{12}^{-1} B_2^T(x_p) P + C_{12} \right] x \quad (182)$$

Thus, it is able to design an observer and a controller satisfying the following equations (183) and (184).

$$\|y_e^-\|_2 \leq \gamma_1 \|w\|_2 \quad (183)$$

$$\|z\|_2 \leq \gamma_2 \|y_e^-\|_2 \quad (184)$$

From the foregoing facts, it will be understood that there exist positive definite symmetric matrixes respectively satisfying the following Riccati equation (185) and inequality (186).

$$A_p Q + Q A_p^T + \frac{1}{\gamma_1} B_{p1} B_{p1}^T - QC_p^T \Theta^T \Theta C_p Q = o \quad (185)$$

$$PA + A^T P + \frac{PL\Theta^{-1}\Theta^{-T}L^T P}{\gamma_2^2} + C_{11}^T C_{11} + C_{12}^T C_{12} < o \quad (186)$$

If the nonlinear weights $a_1(x_p, x_k)$, $a_2(x_p, x_k)$ satisfy a condition for restriction defined by the following equation (187), a control law defined by the following inequality (188) is given by the following, equations (189) and (190).

$$(1 - a_1(x_p, x_k)^2)x_k^T C_{11}^T C_{11} \quad (187)$$

$$x_k + \left[\frac{1}{a_2(x_p, x_k)^2} - 1\right] \times x_k^T P B_2(x_p) D_{12}^{-1} D_{12}^{-T} B_2^T(x_p) P x_k \geq 0$$

$$\|z\|_2 \leq \gamma_1 \gamma_2 \|w\|_2 \quad (188)$$

$$x_{k'} = (A+L_1C_2)x_k+(B_2(x_p)+L_1D_{p2}(x_p))u-L_2y \quad (189)$$

$$u = -D_{12}^{-1} \frac{1}{a_2(x_p, x_k)^2} D_{12}^{-T} B_2^T(x_p) P + C_{12} x_k \quad (190)$$

When the Riccati equation (152) for design of the Kalman filter is compared with the Riccati equation (167), the positive definite symmetric solutions Σ and Q of both the equations will coincide to one another when covariance matrixes V, W are defined by the following equations (191) and (192).

$$W^{-1} = \Theta^T \Theta \quad (191)$$

$$V = \frac{1}{\gamma_1^2} I \quad (192)$$

When Θ, $\gamma_1$ satisfying the equations (191) and (192) are selected by using the covariance matrixes V, W, an observer represented by the following equation (193) coincides with the Kalman filter.

$$x_o' = A x_o + B_2(x_p)u + L(C_{2xo}+D_{p2}(x_p)u-y) \quad (193)$$

The following equations (194) and (195) represent the nonlinear weights $a_1(x_p, x_k)$, $a_2(x_p, x_k)$ satisfying the control for restriction defined by the equation (187).

$$a_1(x_p, x_k) = \sqrt{1 + m_1(x_p, x_k) x_k^T P B_2(x_p) D_{122}^{-1} D_{122}^{-T} B_2^T(x_p) P x_k} \quad (194)$$

$$a_2(x_p, x_k) = \sqrt{\frac{1}{1 + m_1(x_p, x_k) x_k^T C_{11}^T C_{11} x_k}} \quad (195)$$

In the equations (194) and (195), $m_1(x_p, x_k)$ is an appropriated positive definite function. Thus, the positive definite symmetric solution P is calculated by the computer 20. Using the equations (194) and (195), the foregoing equations (189) and (190) are converted into the following equations (196) and (197).

$$x_{k'} = (A+L_1C_2)x_k+(B_2(x_p)+L_1D_{p2}(x_p))u-L_1y \quad (196)$$

$$u = -D_{12}^{-1}((1+m_1(x_p,x_k)x_k^T C_{11}^T C_{11} x_k) x D_{12}^{-T} B_2^T(x_p)P+C_{12})x_k \quad (197)$$

As a result, the positive definite symmetric solution P is found in a simple manner by using a conventional software similarly in the state feedback control system, and the state amount x' and control law u=k (y) are also derived in a simple manner.

d2. Practical Embodiment of a Damping Force Control System in a Wheeled Vehicle on a Basis of the Control Law of Kalman Filter Base.

In this practical embodiment, the damping force control system is designed in the same manner as in the first type control system in the foregoing second embodiment.

Similarly, in the first type control system of the second embodiment, the computer 20 repeats execution of the control program of FIG. 10 at each lapse of the short period of time. At step 110a of the program, the computer 20 calculates a state amount x' and a control input u on a basis of the following equations (198) and (199).

$$x_{k'} = (A+L_1C_2)x_k+(B_2(x_p)+L_1D_{p2}(x_p))u-L_1y \quad (198)$$

$$u = -D_{12}^{-1}((1+m_1(x_p,x_k)x_k^T C_{11}^T C_{11} x_k) x D_{12}^{-T} B_2^T(x_p)P+C_{12})x_k \quad (199)$$

In the equation (198), A is a constant matrix determined by the equations (173), (160), (5), (22) preliminarily memorized in the computer 20. $L_1$ is a constant matrix defined by the equations (175), (166), (167) preliminarily memorized in the computer 20, which constant matrix $L_1$ is an observer gain determined by the positive definite symmetric matrix Q constant matrix $C_p$, the constant matrix $C_2$ determined by the equations (14), (86) and the positive definite matrix Θ. $B_2(x_p)$ is a constant matrix determined by the equations (174), (7), (22) memorized in the computer 20. $D_{p2}(x_p)$ is a constant matrix determined by the equation (13), and the value y is a measurable value which represents a relative displacement amount $x_{pw} - x_{pb}$ input by processing at step 102a and an sprung mass velocity $x_{pb}'$ calculated by the computer 20 at step 104a.

In the equation (199), $D_{12}$ is a coefficient matrix related to the frequency weight $W_u(s)$ defined by the equation (179) and determined in the equation (23), which matrix $D_{12}$ is preliminarily memorized in the computer 20. The factor $m_1(x_p, x_k)$ is an appropriated positive constant function, and an algorithm related to the constant function is preliminarily memorized in the computer 20. The positive constant function $m_1(x_p, x_k)$ may be defined as a positive constant, for example, "1.0". The factor $C_{11}$ is determined by the equation (177) and defined by a coefficient matrix $C_w$, $D_w$, $C_s$ related to the frequency weight $W_s(s)$ determined by the equation (160), which factor $C_{11}$ is memorized as a constant matrix in the computer 20. The factor $B_2(x_p)$ is a constant matrix determined by the equations (174), (7), (22), and the factor P is a positive definite symmetric solution satisfying the equation (186), which factor P is preliminarily memorized as a constant matrix in the computer 20. The factor $C_{12}$ is defined by the equation (178) and preliminarily memorized in the computer 20 as a constant matrix including a coefficient matrix $C_u$ related to the frequency weight $W_u(s)$ determined by the foregoing equation (23).

After processing at step 110a, the computer 20 calculates an overall target damping coefficient C and a target damping force F by processing at step 112 to 118 in the same manner as in the first type control system of the first and second embodiments. In turn, the computer 20 determines the opening degree OP of damper orifice 14a to produce the target damping force F. As a result, the same effect as that in the first type control system of the second embodiment can be expected.

e. Modifications:

Although in each controller of the foregoing embodiments, the linear damping coefficient and frequency weight is fixed, the linear damping coefficient or frequency weight of the controller may be varied in accordance with a travel speed of the vehicle or the mass of the sprung mass member in such a manner as to satisfy a desired performance of the vehicle. Hereinafter, various kinds of modifications of the foregoing embodiments will be described.

e1. First Modification:

Described hereinafter is a first modification of the first embodiment in which the linear damping coefficient of the controller is varied in accordance with a travel speed of the vehicle. As shown in FIG. 6, the computer 20 in this modification is connected to the tire displacement amount sensor 23, stroke sensor 24, sprung mass acceleration sensor 25 and unsprung mass acceleration sensor 26 as in the first embodiment and is further connected to a speed sensor 27 for detecting a travel speed of the vehicle. The computer 20 is arranged to execute a program of FIG. 12 substituted for the processing at step 112 and 114 of FIG. 7.

Figure 12:
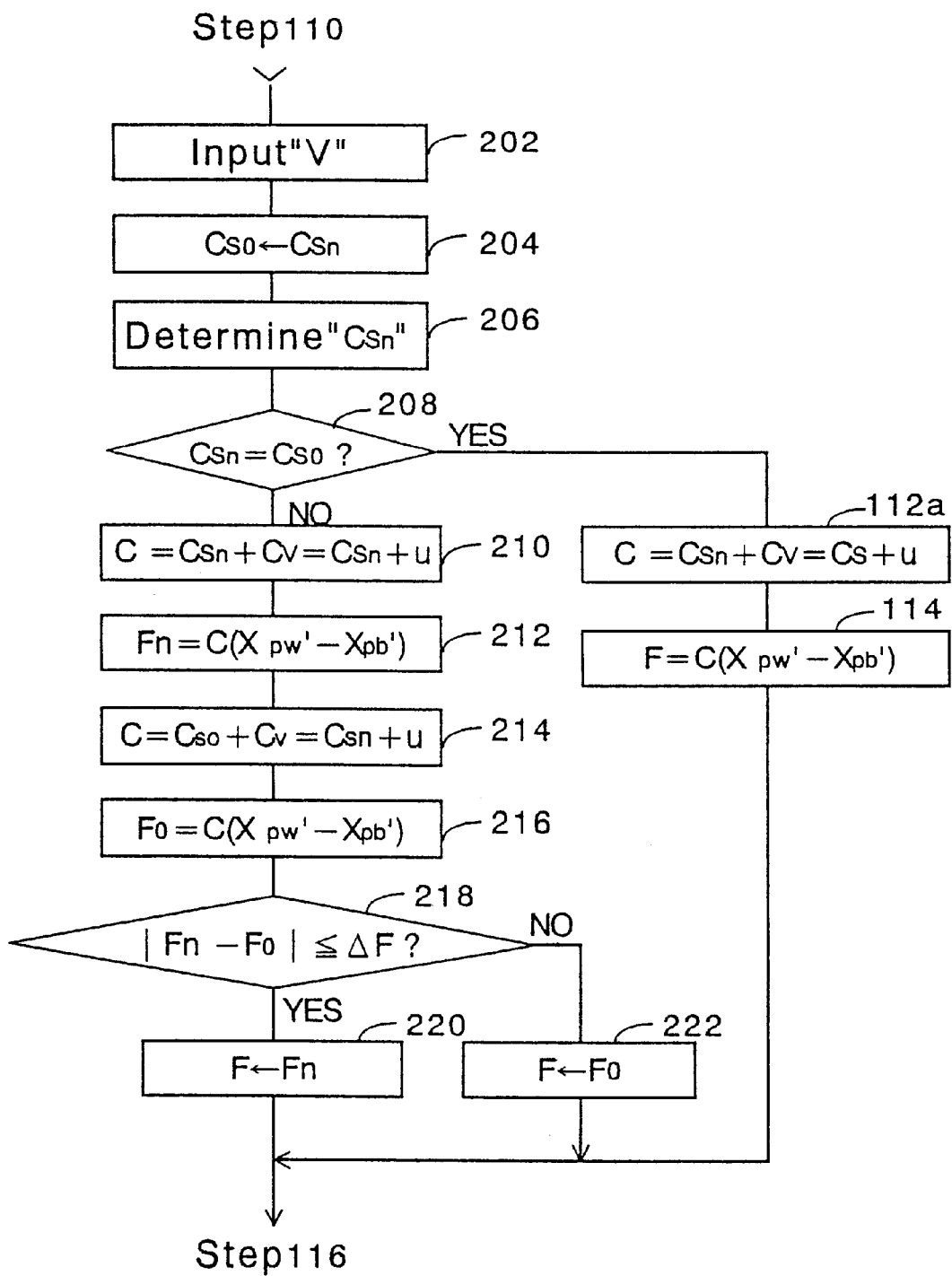
FIG. 12 is a flow chart of a modification of the control program executed by the microcomputer in a third embodiment of the present invention.

After calculated a control input u, a state variable $x_u$ of a frequency weight related to the control input u and an extended state amount x by processing at step 110 shown in FIG. 7, the computer 20 inputs a detection signal indicative of the travel speed V of the vehicle at step 202 shown in FIG. 12 and renews at step 204 an old linear damping coefficient $C_{so}$ determined by previous processing of the program to a new liner damping coefficient $C_{sn}$. The damping coefficients $C_{so}$, $C_{sn}$ correspond with the linear damping coefficient $C_s$ in the first embodiment and are varied in accordance with the travel speed V of the vehicle.

After processing at step 204, the computer 20 reads out at step 206 a linear damping coefficient $C_s$ corresponding with the travel speed of the vehicle from a vehicle speed-linear damping coefficient table stored therein and sets the linear coefficient $C_s$ as a new linear damping coefficient $C_{sn}$. The vehicle-speed-linear damping coefficient table is formed to represent the linear damping coefficient $C_s$ in relation to an increase of the vehicle speed V respectively at plural speed ranges such as a low speed range of from 0 Km/h to 40 Km/h, a medium speed range of from 40 Km/h to 80 Km/h and a high speed range of more than 80 Km/h.

At the following step 208, the computer 20 determines whether the new linear damping coefficient $C_{sn}$, coincides with the old linear damping coefficient $C_{so}$ or not (whether the vehicle speed is in the same speed range as a previous speed range or not). If the answer at step 208 is "Yes", the computer 20 causes the program to proceed to step 112a and 114. At step 112a, the computer 20 calculates an overall target damping coefficient C based on the following equation (200) wherein the new linear damping coefficient $C_{sn}$ is substituted for the linear damping coefficient $C_s$ determined by processing at step 112 in the first embodiment.

$$C=C_{sn}+C_v=C_{sn}+u \quad (200)$$

At step 114, the computer 20 calculates a target damping force F based on the following equation (201) by the same processing as that in the fist embodiment.

$$F=C(x_{pw}'-x_{pb}') \quad (201)$$

After processing at step 114, the control program proceeds to step 116 of FIG. 7 where the computer 20 determines the opening degree OP of damper orifice 14a to produce the target damping force F.

If the answer at step 208 is "No", the computer 20 causes the program to proceed to step 210 to 222. At step 210, 212, the computer 20 calculates a new target damping force F, based on the equations (200) and (201). At the following step 214, the computer 20 calculates an overall target damping coefficient C of the damper 14 based on the following equation (202) wherein the new linear damping coefficient $C_{sn}$ is substituted at step 210 for the old linear damping coefficient $C_{so}$.

$$C=C_{so}+C_v=C_{so}+u \quad (202)$$

At step 216, the computer 20 calculates an old target damping force $F_o$ using the old linear damping coefficient $C_{so}$ on a basis of the equation (201) as in the processing at step 114, 212.

Subsequently, the computer 20 determines at step 218 whether an absolute value $|F_n-F_o|$ of a difference between the new target damping force $F_n$ and old target damping force $F_o$ is less than a predetermined value $\Delta F$ or not. If the answer at step 218 is "Yes", the computer 20 sets the new target damping force $F_n$ as a target damping force F at step 220. If the answer step 218 is "No", the computer 20 sets the old target damping force $F_o$ as a target damping force F at step 222. After processing at step 220 or 222, the computer 20 causes the program to proceed to step 116 of FIG. 7 in the first embodiment. Thus, the computer 20 determines the opening degree OP of damper orifice 14a at step 118 to produce the target damping force F.

From the above description, it will be understood that in the first modification, the linear damping coefficient of damper 14 or the controller in the first embodiment is switched over in accordance with the vehicle speed V by processing at step 202–220 to enhance sensory characteristics in a desired performance of the vehicle. Additionally, in case the target damping force F is greatly varied by changeover of the linear damping coefficient or controller, the target damping force F is determined on a basis of the previous linear damping coefficient without change of the linear damping coefficient. This is useful to eliminate discontinuity of the target damping force F.

e2. Second Modification:

Described hereinafter is a second modification of the first embodiment in which the frequency weight of the controller is varied in accordance with a travel speed of the vehicle. As shown in FIG. 6, the computer 20 in this modification is connected to the tire displacement amount sensor 23, stroke sensor 24, sprung mass acceleration sensor 25 and unsprung mass acceleration sensor 26 as in the first embodiment and is further connected to a speed sensor 27 for detecting a travel speed V of the vehicle as in the first modification. The computer 20 is arranged to execute a program of FIG. 13 substituted for the processing at step 106 to 114 of FIG. 7.

After executed the processing at step 108 of FIG. 7 in the first embodiment, the computer 20 inputs at step 230 a detection signal indicative of the travel speed V of the vehicle and renews at step 232 old coefficient matrixes $A_{wo}$, $B_{wo}$, $C_{wo}$, $D_{wo}$, $A_{uo}$, $B_{uo}$, $C_{uo}$, $D_{uo}$ related to the frequency weights $W_s(s)$, $W_u(s)$ to new coefficient matrixes $A_{wn}$, $B_{wn}$, $C_{wn}$, $D_{wn}$, $A_{un}$, $B_{un}$, $C_{un}$, $D_{un}$. The old and new coefficient matrixes correspond with the coefficient matrixes $A_w$, $B_w$, $C_w$, $D_w$, $A_u$, $B_u$, $C_u$, $D_u$ related to the frequency weights $W_s(s)$, $W_u(s)$ in the first embodiment and are varied in accordance with the travel speed V of the vehicle. The old coefficient matrixes are determined by previous processing of the program, and the new coefficient matrixes are newly determined by instant processing of the program.

After processing at step 232, the computer 20 reads out at step 234 coefficient matrixes $A_w$, $B_w$, $C_w$, $D_w$, $A_u$, $B_u$, $C_u$, $D_u$ in relation to the travel speed V of the vehicle from a vehicle speed-coefficient matrix table stored therein and sets the coefficient matrixes as new coefficient matrixes $A_{wn}$, $B_{wn}$, $C_{wn}$, $D_{wn}$, $A_{un}$, $B_{un}$, $C_{un}$, $D_{un}$. The vehicle speed-coefficient matrix table is formed to determine the coefficient matrixes $A_w$, $B_w$, $C_w$, $D_w$, $A_u$, $B_u$, $C_u$, $D_u$ in accordance with an increase of the vehicle speed V such that each characteristic of the frequency weights shown in FIGS. 3(A) to 3(D) changes in accordance with the vehicle speed V. particularly each gain increases in accordance with an increase of the vehicle speed V.

At the following step 236, the computer 20 determines whether the vehicle speed V has changed from the previous speed range or not (whether the new coefficient matrixes determined by processing at step 234 is different from the old coefficient matrixes determined by processing at step 232 or not). If the answer at step 236 is "No", the program proceeds to step 238 where the computer 20 calculates a target damping force F based on the new coefficient matrixes $A_{wn}$, $B_{wn}$, $C_{wn}$, $D_{wn}$, $A_{un}$, $B_{un}$, $C_{un}$, $D_{un}$ as in the processing at step 106 to 114 in the first embodiment. After processing at step 238, the program proceeds to step 116 of FIG. 7 as in the first embodiment to determine the opening degree OP of damper orifice 14a for effecting the calculated target damping force F.

If the answer at step 236 is "Yes", the computer 20 calculates at step 240 a target damping force F based on the new coefficient matrixes $A_{wn}$, $B_{wn}$, $C_{wn}$, $D_{wn}$, $A_{un}$, $B_{un}$, $C_{un}$, $D_{un}$ by the same processing as the processing at step 238 and sets the calculated target damping force F as a new target damping force $F_n$. At the following step 242, the computer 20 calculates a target damping force F based on the old coefficient matrixes $A_{wo}$, $B_{wo}$, $C_{wo}$, $D_{wo}$, $A_{uo}$, $B_{uo}$, $C_{uo}$, $D_{uo}$ by the same processing as !he processing at step 106 to 114 in the first embodiment and sets the calculated target damping force F as an old target damping force $F_n$.

Subsequently, the computer 20 determines at step 244 whether an absolute value $|F_n - F_o|$ of a difference between the new target damping force $F_n$ and the old target damping force $F_o$ is less than a predetermined small value $\Delta F$ or not. If the answer at step 244 is "Yes", the computer 20 sets at step 246 the new target damping force $F_n$ as the target damping force F. If the answer at step 244 is "No", the computer 20 sets at step 248 the old target damping force $F_o$ as the target damping force F. After processing at step 244–248, the computer 20 causes the program to proceed to step 116 of FIG. 7 in the first embodiment. Thus, the computer 20 determines the opening degree OP of damper orifice 14a at step 118 to produce the target damping force F.

From the above description, it will be understood that in the second modification, the coefficient matrixes $A_w$, $B_w$, $C_w$, $D_w$, $A_u$, $B_u$, $C_u$, $D_u$ (or the controller) related to the frequency weights $W_s(s)$, $W_u(s)$ are switched over in accordance with the vehicle speed by processing at step 230–248. In case the target damping force F is greatly varied by changeover of the coefficient matrixes, the target damping force F is determined by the previous coefficient matrixes without change of the coefficient matrixes. This is useful to eliminate discontinuity of the target damping coefficient F.

Figure 13:
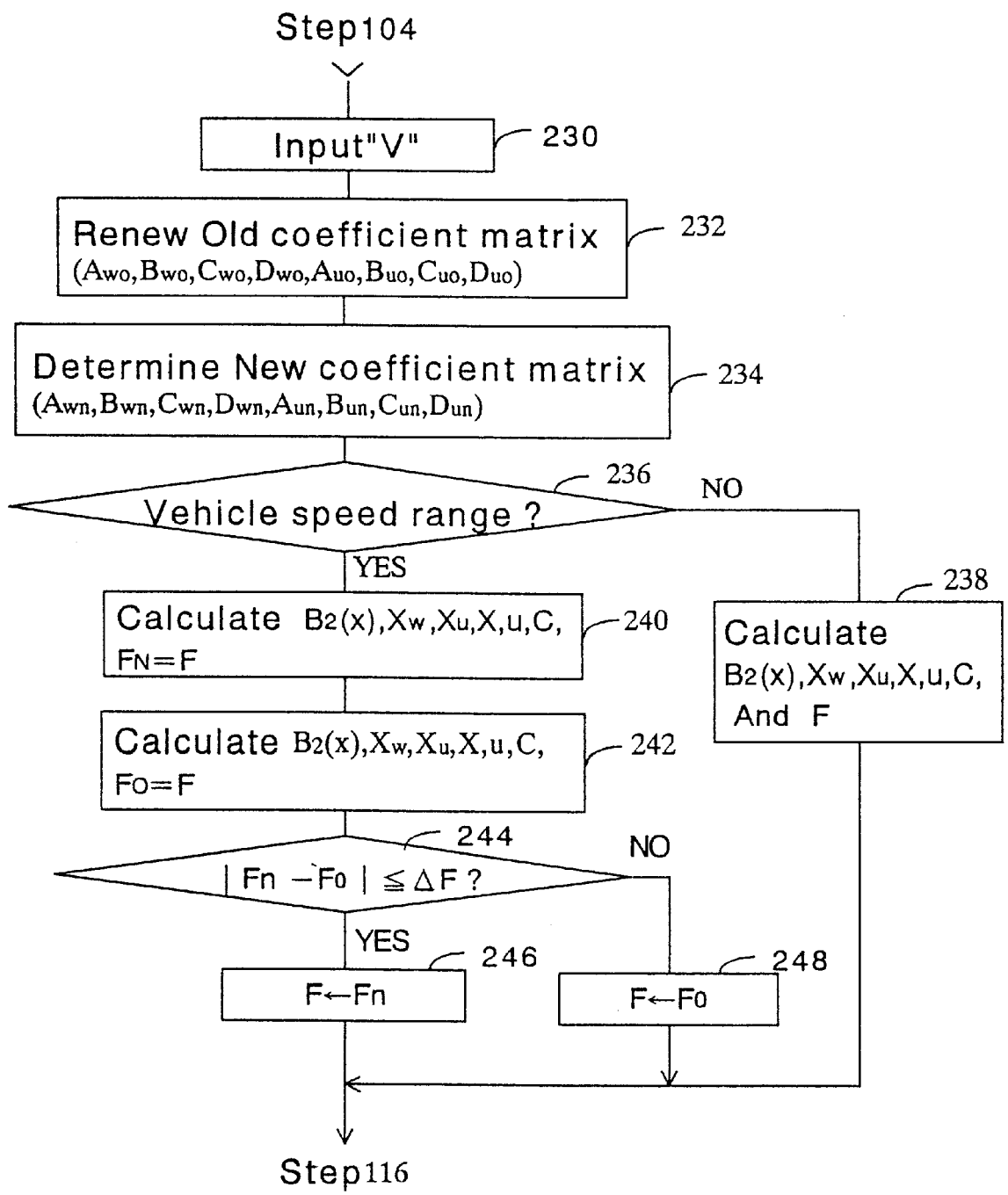
FIG. 13 is a flow chart of another modification of the control program executed by the microcomputer in a first modification of the foregoing embodiments.

Although in the foregoing first and second modifications, either the linear damping coefficient or the frequency weight is varied in accordance with the vehicle speed, both the linear damping coefficient and the frequency weight may be varied in accordance with the vehicle speed. In such a case, the program of FIGS. 12 and 13 is arranged to change both the linear damping coefficient and the frequency weight in accordance with the vehicle speed.

Although in the foregoing first and second modifications, the controller (the linear damping coefficient or the frequency weight) is switched over in accordance with the vehicle speed or the mass of the sprung mass member, the controller may be switched over in accordance with change of a state amount of the vehicle such as pitch, roll or the like of the vehicle. In this case, the computer 20 is connected to a sensor for detecting the state amount of the vehicle thereby to switch over the controller (the linear damping coefficient or the frequency weight) in accordance with the detected state amount. In such a case, it is preferable that variation width of the target damping force is restricted if the calculated target damping force is greatly varied by changeover of the controller.

e3. Third Modification:

Described hereinafter is a third modification of the first embodiment in which the linear damping coefficient or the frequency weight is varied in accordance with the mass of the sprung mass member. As shown by a broken line in FIG. 6, the computer 20 is connected to a sprung mass sensor 28 substituted for the vehicle speed sensor 27. The sprung mass sensor 28 is in the form of a load sensor disposed between the sprung mass member 10 and unsprung, mass member 11 of the vehicle to detect a mass $M_b$ of the sprung mass member (the vehicle body) 10 for applying a detection signal indicative of the detected mass $M_b$ to the computer 20.

In this modification, a portion of the control program shown in FIG. 7 is modified as shown in FIG. 12. As step 202 of FIG. 12, the computer 20 inputs a detection signal indicative of the mass $M_b$ of the sprung mass member 10 from the sprung mass sensor 28, in stead of the vehicle speed V. At the following step 206, the computer 20 reads out a linear damping coefficient $C_s$ corresponding with the mass $M_b$ of the sprung mass member 10 from a mass of the sprung mass member-linear damping coefficient table stored therein and sets the linear damping coefficient $C_s$ as a new linear damping coefficient $C_{sn}$. The mass of the sprung mass member-linear damping coefficient table is formed to determine the linear damping coefficient $C_s$ in relation to an increase of the mass $M_b$ of the sprung mass member respectively at plural steps the order of which is determined in accordance with the increase of the mass $M_b$. in addition, the detected mass $M_b$ of the sprung mass member 10 may be utilized for calculation of the variables $B_2(x)$ and u.

In the third modification, the linear damping coefficient of the damper 14 is switched over in accordance with the mass $M_b$ of the sprung mass member by processing at step 202, 206, 210, 212, and 220. This is useful to enhance sensory characteristics in a desired performance of the vehicle. In case the target damping force F is greatly varied by changeover of the controller or the linear damping coefficient of the damper 14 caused by processing at step 202–220, the target damping force F is determined on a basis of the previous linear damping coefficient without change of the linear damping coefficient. This is useful to eliminate discontinuity of the target damping force F and to eliminate a sense of incongrulity in control of the damping force.

In the case that the frequency weight of the controller is adjusted in accordance with the mass of the sprung mass member, a portion of the control program of FIG. 7 is modified as shown in FIG. 13. At step 230 of: FIG. 13, the computer 20 inputs a detection signal indicative of the mass $M_b$ of the sprung mass member 10, in stead of the vehicle speed V At the following step 234, the computer 20 reads out the coefficient matrixes $A_w$, $B_w$, $C_w$, $D_w$, $A_u$, $B_u$, $C_u$, $D_u$ corresponding with the mass $M_b$ of the sprung mass member from a mass of the sprung mass member-coefficient matrix table stored therein and sets the coefficient matrixes as new coefficient matrixes $A_{wn}$, $B_{wn}$, $C_{wn}$, $D_{wn}$, $A_{un}$, $B_{un}$, $C_{un}$, $D_{un}$. The mass of the sprung mass member-coefficient matrix table is formed to determine the coefficient matrixes $A_w$, $B_w$, $C_w$, $D_w$, $A_u$, $B_u$, $C_u$, $D_u$ in relation to an increase of the mass $M_b$ of the sprung mass member respectively at plural regions wherein each gain shown in FIGS. 3(A) to 3(D) changes in accordance with the mass $M_b$ of the sprung mass member. In this case, the mass $M_b$ of the sprung mass member may be utilized for calculation of the variables $B_2(x)$ and u.

In the modification described above, the coefficient matrixes $A_w$, $B_w$, $C_w$, $D_w$, $A_u$, $B_u$, $C_u$, $D_u$ are switched over in accordance with the mass $M_b$ of the sprung mass member by processing at step 230, 234, 240, 246. This is useful to enhance sensory characteristics in a desired performance of the vehicle. In case the target damping force F is greatly varied by changeover of the controller or the coefficient matrixes $A_w$, $B_w$, $C_w$, $D_w$, $A_u$, $B_u$, $C_u$, $D_u$ related to the frequency weights $W_s(s)$, $W_u(s)$, the target damping force F is determined on a basis of the previous coefficient matrixes without change of the coefficient matrixes. This is useful to eliminate discontinuity of the target damping force F and to eliminate a sense of incongruity in control of the damping force.

Although in the third modification, either the linear damping coefficient or the frequency weight is varied in accordance with the mass of the sprung mass member, both the linear damping coefficient and the frequency weight may be varied in accordance with the mass of the sprung mass member. In this case, the control programs shown in FIGS. 12 and 13 are arranged to control both the linear damping coefficient and the frequency weights in accordance with the mass of the sprung mass member.

In the case that an air spring mechanism is assembled within the suspension mechanism of the wheeled vehicle, the sprung mass sensor 28 can be replaced with estimation means provided in the computer 20 for estimating the mass $M_b$ of the sprung mass member. Assuming that in estimation of the mass $M_b$ of the sprung mass member, vertical acceleration of the sprung mass member 10 in a moment is defined as a (k)=$x_{pb}$", the spring constant of the air spring mechanism is defined as Ks (k), a relative displacement amount of the sprung mass member 10 to the unsprung mass member 10 is defined as s (k)=$X_{pw}$–$X_{pb}$, and a damping force of the suspension mechanism is defined as F (k), the equation of movement of the spring mass member 10 in the moment is expressed as follows.

$$M_b \cdot a(k) = K_s(k) \cdot s(k) + F(k) \quad (203)$$

where k is a positive integer.

Assuming that a ratio of the spring constant Ks (k) to the mass $M_b$ of the sprung mass member is defined as β (k)(=Ks (k)/$M_b$), the equation (203) is converted into the following equation (204).

$$M_b \cdot [a(k) - \beta(k) \cdot s(k)] = F(k) \quad (204)$$

The suspension mechanism associated with the air spring mechanism is designed in such a manner that the ratio β (k) of the spring constant Ks to the mass $M_b$ of the sprung mass member becomes statically constant. Accordingly, the above equation (204) can be converted into the following equation (206) in a sufficient time (more than about ten times a resonant frequency of the sprung mass member 10) during which the ratio β (k) is deemed as the constant value β (an average value). In other word, the above equation (204) can be converted into the following equation (206) with respect to the vertical acceleration a (k), spring constant Ks (k), relative displacement amount s (k) and damping force F (k) in a period of time during which the following equation (205) is satisfied.

$$\beta = (1/Q) \cdot \sum_{k=1}^{Q} \beta(k) \quad (205)$$

$$M_b \cdot [a(k) - \beta \cdot s(k)] = F(k) \quad (206)$$

Thus, the mass $M_b$ of the sprung mass member can be accurately estimated by the following equation (207).

$$M_b = \frac{\sum_{k=1}^{Q} F(k) \cdot \{a(k) - \beta \cdot s(k)\}}{\sum_{k=1}^{Q} \{a(k) - \beta \cdot s(k)\}^2} \quad (207)$$

Figure 14:
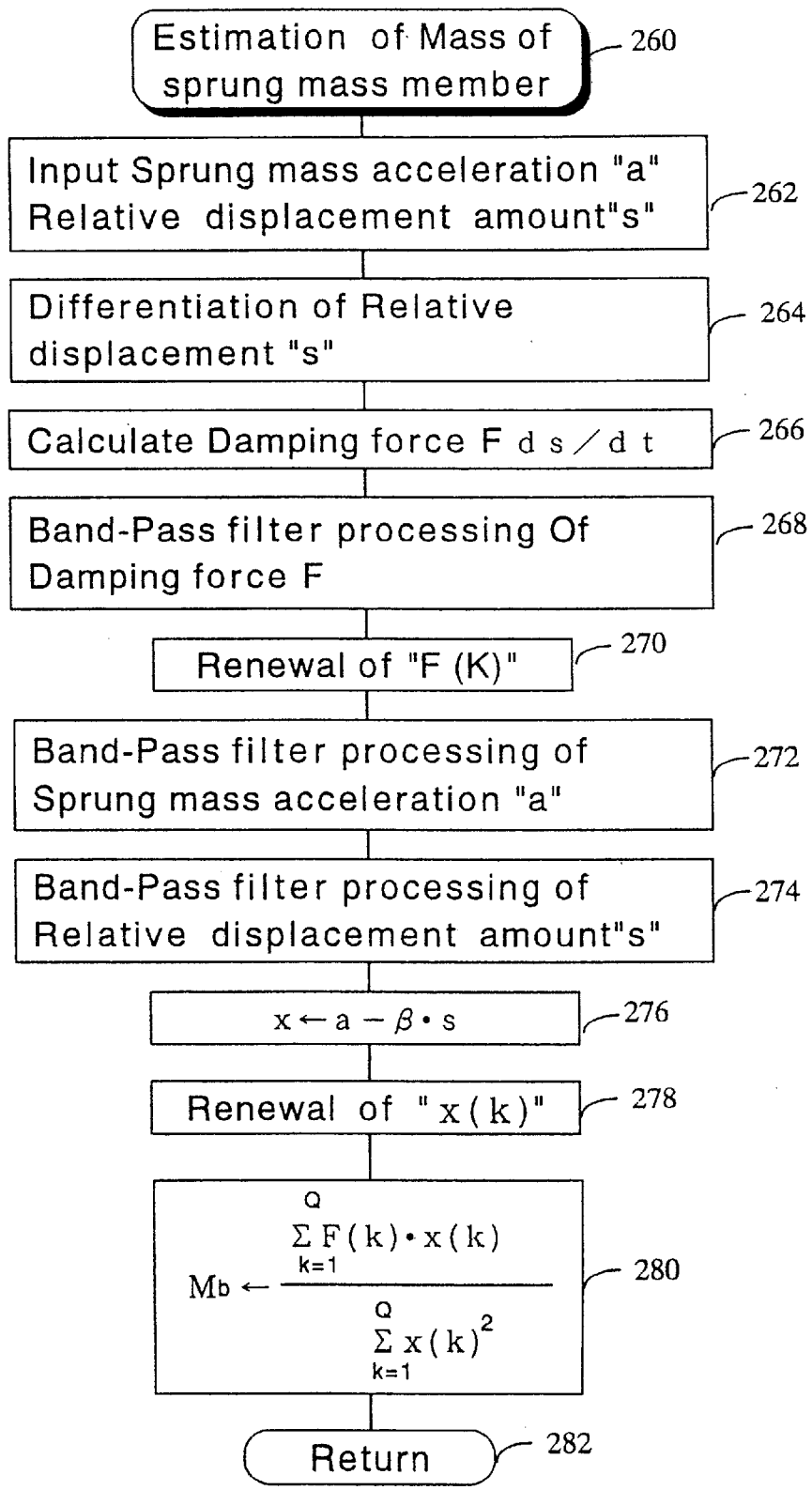
FIG. 14 is a flow chart of a program for estimation of the mass of a sprung mass member in a second modification of the foregoing embodiments.

In the estimation means for estimating the mass of the sprung mass member, the computer 20 repeatedly executes a control program shown by a flow chart in FIG. 14 at each lapse of the short time. The computer 20 starts at step 260 to execute the control program and memorizes at step 262 the sprung mass acceleration $x_{pb}$" applied from the sprung mass sensor 25 as a sprung mass acceleration a and the relative displacement amount $x_{pw}$–$x_{pb}$ applied from the stroke sensor 24 as a relative displacement amount s. In addition, with respect to the sprung mass acceleration a and relative displacement amount s, an appropriate number of previous values are memorized with the input values in the computer 20 to be used for differentiation processing and band-pass processing described below. At the following step 264, the computer 20 calculates a relative velocity ds/dt of the sprung mass member 10 to the unsprung mass member 11 by differentiation of the relative displacement amount s.

Subsequently, the computer 20 memorizes at step 266 a damping force F in relation to the opening degree OP of damper orifice 14a (either one of 1–N) and the calculated relative velocity ds/dt with reference to a relative velocity-damping force table shown in FIG. 8. In this instance, the value determined by processing at step 116 of FIG. 7 is used as the opening degree OP of damper orifice 14a. With respect to the damping force F, an appropriate number of previous values are memorized with the damping force F in the computer 20 to be used for a band-pass processing described below.

At the following step 268, the computer 20 applies a band-pass filter processing to the damping force F memorized at step 266 to eliminate a direct current component and a noise component from the damping force F. Subsequently, the computer 20 renews at step 270 a row of Q numbers of data F (k) (K=1, 2, . . . Q) indicative of the damping force F in response to lapse of a time. The data row F (k) represents a new data in the order of the value k from 1 to Q. In renewal of the data row F (k), the data F (1) is deleted, and the data F (1), F (2), . . . F (Q-1) are renewed to the data F (2), F (3), . . . F (Q) in sequence. Thus, the computer 20 memorizes the new damping force F obtained by the band-pass filter processing as the data F (Q). The data row F (k) is constituted as a set of data with the other data row x (k) described later in a sufficient time (more than ten times the resonant frequency (0.5–1.0 sec.) of the sprung mass member during which a ratio Ks/$M_b$ of a spring constant Ks of air chambers 11a–11d to the mass $M_b$ of the sprung mass member at each road wheel is deemed as a constant value. In this embodiment, a sampling frequency of the set of data (a renewal frequency of the set of data) is defined in about 5 to 20 msec., and the value Q is determined in a value of about 3,000.

After processing at step 270, the computer 20 applies a band-pass filter processing to the sprung mass acceleration a memorized by processing at step 262 to eliminate a direct current component and a noise component from the sprung mass acceleration $x_{pb}$" (=a) detected by the sprung mass acceleration sensor 25. At the following step 274, the computer 20 applies a band-pass filter processing to the relative displacement amount s memorized by processing at step 262 to eliminate a direct current component and a noise component from the relative displacement amount $X_{pw}-X_{pb}$ (=s) detected by the stroke sensor 24. Thus, the computer 20 calculates at step 276 a value x based on the following equation (208) and renews at step 278 a row of Q numbers of data x (k) (K=1, 2, . . . Q) indicative of the value x in response to lapse of a time. The value β in the following equation (208) is a constant value corresponding with the ratio $Ks/M_b$ of the spring constant Ks to the mass $M_b$ of the sprung mass member in a sufficient time during which the ratio $Ks/M_b$ is deemed as a constant value.

$$x=a-\beta \cdot s \tag{208}$$

At the following step 280, the computer 20 calculates the mass $M^b$ of the sprung mass member based the following equation (209) and finishes the execution of the program at step 282.

$$M_b = \frac{\sum_{k=1}^{Q} F(k) \cdot x(k)}{\sum_{k=1}^{Q} x(k)^2} \tag{209}$$

With the estimation means described above, the mass $M_b$ of the sprung mass member can be calculated by the computer 20 in a simple manner without the provision of a particular sensor such as the sprung mass sensor 28 in the form of a load sensor.

In a practical embodiment of the estimation means, the equation (208) may be replaced with the following equation (210) wherein the mass $M_b$ of the sprung mass member is estimated on a basis of the data row F (k), a (k), s (k) (k=1, 2 . . . Q) respectively indicative of the damping force F, sprung mass acceleration a and relative displacement amount s and the predetermined ratio β (a constant).

$$M_b = \frac{\sum_{k=1}^{Q} F(k) \cdot \{a(k) - \beta \cdot s(k)\}}{\sum_{k=1}^{Q} \{a(k) - \beta \cdot s(k)\}^2} \tag{210}$$

In this case, the data row a (k), s (k) (k=1, 2, . . . Q) can be obtained on a basis of the sprung mass acceleration a and relative displacement amount s without processing at step 276, 278 in foregoing embodiment, and the data row a (k), s (k) can be used with the data row F (k) indicative of the damping force F for calculation of the equation (210). Although in the above example, the mass $M_b$ of the sprung mass member has been determined by once processing at step 280, the processing at step 280 may be executed plural times to determine an average of the mass $M_b$ of the sprung mass member. Although in the above example, the mass $M_b$ of the sprung mass member has been estimated by a least squares method, a generalized least squares method, a maximum likelihood method or an instrumental variable method may be adapted to estimate the mass of the sprung mass member. With the instrumental variable method, the equation (206) can be rewritten into the following equation (211) taking into account a sensor observation noise e (k).

$$M_b \cdot [a(k)-\beta \cdot s(k)]=F(k)+e(k) \tag{211}$$

In the equation (211), a control instruction value $f_{cr}(k)$ in the form of a real output strongly correlated with the data row F (k) is used as the instrumental variable. The damping force F (k) is an actual damping force of the damper 14, while the control instruction value $f_{cr}(k)$ is obtainable on a basis of the target damping force calculated by processing at step 238, 240, 242 of FIG. 13 and memorized in time series Thus, the mass $M_b$ of the spring mass member can be calculated by the following equation (212).

$$M_b = \frac{\sum_{k=1}^{Q} F(k) \cdot f_{cr}(k)}{\sum_{k=1}^{Q} \{a(k) - \beta \cdot s(k)\} \cdot f_{cr}(k)} \tag{212}$$

e4. Fourth Modification:

The linear damping coefficient in the second and third embodiments may be varied in accordance with the vehicle speed. In such a case, the computer 20 is connected to the tire displacement amount sensor 23, stroke sensor 24, sprung mass acceleration sensor 25 and unsprung mass acceleration sensor 26 and is further connected to the vehicle speed sensor 27 as shown by the broken line in FIG. 6. In this modification, the computer 20 is arranged to execute the program of FIG. 12 substituted for the processing at step 112, 114 of FIG. 10.

Alternatively, the frequency weights of the controller in the second and third embodiments may be varied in accordance with the vehicle speed. In this case, the computer 20 is arranged to execute the processing at step 230–248 of FIG. 13 substituted for the processing at step 106a–114 of FIG. 10. Provided that, he computer 20 executes the processing at step 106a–114 of FIG. 10 at step 238, 240 and 242 of FIG. 13 to calculate the target damping force F. Furthermore, the linear damping coefficient or the frequency weights of the controller in the second or third embodiment may be varied in accordance with the mass of the sprung mass member as in the third modification.

Figure 15:
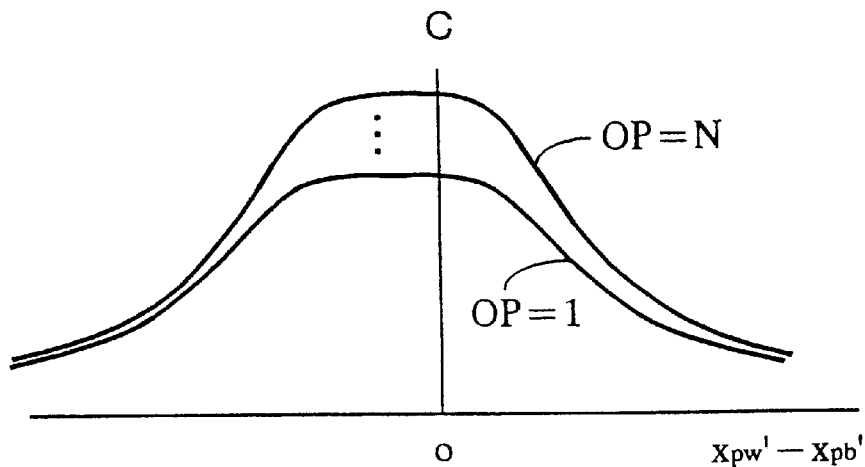
FIG. 15 is a graph showing a data characteristic in a relative velocity-damping coefficient table in a third modification of the foregoing embodiments.
Figure 16:
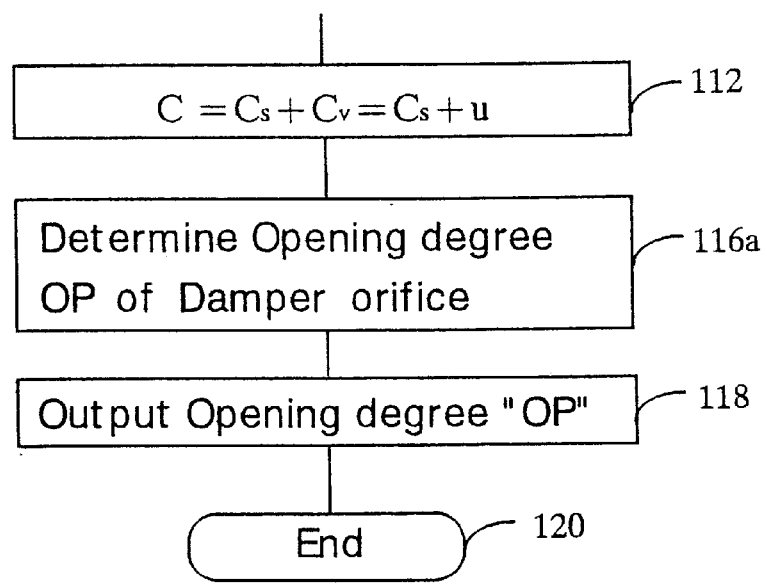
FIG. 16 is a flow chart of a fourth modification of the control program shown in FIGS. 7 and 10.

In such modifications described above, the linear damping coefficient or the frequency weights is switched over in accordance with change of the vehicle speed or the mass of the sprung mass member to enhance sensory characteristics in a desired performance of the vehicle and to eliminate discontinuity of the target damping force F.

f. Other Modifications:

Although in the foregoing embodiments and modifications, the opening degree OP of the damper orifice is determined on a basis of the relative velocity-to-damping force table representing a relationship between the relative velocity $x_{pw}'-x_{pb}'$ and the damping force F, the opening degree OP of the damper orifice may be determined on a basis of a relative velocity-to-damping coefficient table representing a relationship between the relative velocity $x_w'-x_b'$ and the damping coefficient C as shown in FIG. 15. In such a modification, the computer 20 is arranged to execute a control program shown in FIG. 16. In the program of FIG. 16, the processing at step 114 of FIG. 7 or 10 in the foregoing embodiments and modifications is eliminated, and the processing at step 116 is changed as described below.

During execution or the program shown in FIG. 16, the computer 20 calculates at step 112 a damping coefficient C in the same manner as in the foregoing embodiments and modifications and determines at step 116a the opening degree OP of the damper orifice corresponding with the relative velocity $x_{pw}'-x_{pb}'$ or the estimated relative velocity $x_{pw}'^{\wedge}-x_{pb}'^{\wedge}$ and the calculated damping coefficient C with reference to the relative velocity-to-damping coefficient table.

Although in the foregoing embodiments and modifications, the opening degree OP of the damper orifice 14a is switched over at plural steps (N steps), the damper 14 may be designed to be switched over continuously or at plural steps more than N steps. With such design of the damper 14, it is able to more precisely control the damping force and damping coefficient. In this case, it is preferable that the opening degree OP of the damper orifice determined by processing at step 116, 116a is interpolated in an appropriate manner.

Although in the foregoing embodiments and modifications, the state space of the generalized plant is expressed by the tire displacement amount $x_{pr}-x_{pw}$, relative displacement amount $x_{pw}-x_{pb}$, unsprung mass acceleration $x_{pw}'$ and sprung mass acceleration $x_{pb}'$, the state space of the generalized plant may be expressed by other physical amount related to vertical movement of the sprung mass member 10 and unsprung mass member 11.

Although in the foregoing embodiments and modifications, the sprung mass velocity $x_b'$ influential in resonance of the sprung mass member 10, the relative velocity $x_w'-x_b'$ influential in resonance of the unsprung mass member 11 and the sprung mass acceleration $x_b''$ influential in the riding comfort of the vehicle are used as the evaluation output $z_p$, one or two kinds of the above factors may be used as the evaluation output $z_p$. In addition, a physical amount related to movement of the sprung mass member such as the sprung mass acceleration $x_b''$ or sprung mass displacement amount $x_b$ may be used in stead of the sprung mass velocity $x_b'$ influential in resonance of the sprung mass member 10. Alternatively, a physical amount related to movement of the unsprung mass member 11 such as the unsprung mass velocity $x_w'$ or tire displacement amount $x_r-x_w$ may be used in stead of the relative velocity $x_w'-x_b'$ influential in resonance of the unsprung mass member 11.

Although in the foregoing embodiments and modifications, the nonlinear $H_\infty$ control theory is applied as a control theory capable of providing a specification for design of the control system in a predetermined frequency range, a linear matrix inequality or a bilinear matrix inequality may be applied as the control theory.

Although in the foregoing embodiments and modifications, the present invention has been adapted to a suspension mechanism of a wheeled vehicle, the present invention can be adapted to a resilient support mechanism including a resilient member such as a rubber member, a spring member or the like for resiliently supporting thereon a component member of the vehicle and a damper assembled therein for damping vibration of the component member. For example, the present invention can be adapted to a support mechanism including a resilient member for resiliently supporting thereon a prime mover of the vehicle and a damper assembled therein for damping vibration of the prime mover. Furthermore, the present invention can be adapted to various kinds of resilient support mechanisms including a resilient member such as a rubber member, a spring member or the like for resiliently supporting thereon an object and a damper capable of damping vibration of the object.

What is claimed is:

1. A control system for a resilient support mechanism, including a damper or a shock absorber assembled therein for resiliently supporting an object thereon, wherein a control theory capable of providing a specification for design of the control system in a predetermined frequency range is applied to a nonlinear plant to calculate a target damping force and to adjust an actual damping force of the damper or shock absorber to the calculated target damping force.

2. A control system for a resilient support mechanism in a wheeled vehicle, the support mechanism including a damper or a shock absorber assembled therein for resiliently supporting an object thereon, wherein a control theory capable of a specification for design of the control system in a predetermined frequency range is applied to a nonlinear plant to calculate a target damping force and to adjust an actual damping force of the damper or shock absorber to the calculated target damping force.

3. A control system for a suspension mechanism including a damper or a shock absorber disposed between an unsprung mass member and a sprung mass member of a wheeled vehicle for resiliently supporting the sprung mass member thereon, wherein a control theory capable of providing a specification for design of the control system is applied to a nonlinear plant to calculate a target damping force and to adjust an actual damping force of the damper or shock absorber to the calculated target damping force.

4. A control system as claimed in claim 1, wherein a nonlinear $H_\infty$ control theory is applied as the control theory.

5. A control system as claimed in claim 4, wherein one of a nonlinear $H_\infty$ state feedback control, a nonlinear $H_\infty$ output feedback control or a nonlinear $H_\infty$ control using a Kalman filter is applied as a control based on the control theory.

6. A control system as claimed in claim 1, wherein a damping coefficient of the damper or shock absorber is divided into a linear portion and a nonlinear portion, and wherein each gain of the linear portion and nonlinear portion is defined in such a manner that the target damping force is determined in a range of an actual damping force produced by the damper or shock absorber.

7. A control system as claimed in claim 6, wherein the linear portion of the damping coefficient of the damper or shock absorber is defined to be located between a minimum damping force of the damper or shock absorber and a maximum damping force of the damper or shock absorber.

8. A control system as claimed in claim 1, wherein the damper is constructed to be switched over at plural steps, wherein the damping coefficient of the damper is divided into a linear portion and a nonlinear portion, and wherein the linear portion of the damping coefficient is determined in such a manner that a damping force defined by the linear portion becomes approximately equal to a damping force produced by the damper at its either one of plural steps in a small range.

9. A control system as claimed in claim 1, wherein the damping coefficient of the damper is divided into a linear portion and a nonlinear portion, wherein the nonlinear portion is applied as a control input to a generalized plant estimated to calculate the target damping force, and wherein the control input is applied with a predetermined frequency weight.

10. A control system for a suspension mechanism as claimed in claim 3, comprising:
    detection means for detecting a state amount related to vertical movement of the sprung and unsprung mass members; and
    means for memorizing a positive definite symmetric solution obtained on a basis of the control theory and for calculating the target damping force based on the memorized positive definite symmetric solution and the detected state amount.

11. A control system for a suspension mechanism as claimed in claim 3, comprising:
    detection means for detecting a portion of a plurality of state amounts related to vertical movement of the sprung and unsprung mass members;

estimation means for estimating the other portion of the state amounts by using an observer; and means for memorizing a positive definite symmetric solution obtained on a basis of the control theory and for calculating the target damping force based on the memorized positive definite symmetric solution, the detected state amount and the estimated state amount.

12. A control system in a suspension mechanism as claimed in claim 3, wherein the damping coefficient of the damper is divided into a linear portion and a nonlinear portion, and wherein the control system comprises:

first calculation means for calculating the nonlinear portion of the damping coefficient on a basis of the control theory;

second calculation means for calculating the damping coefficient of the damper based on synthesis of the linear portion and the calculated nonlinear portion;

detection means for detecting or estimating a relative velocity of the sprung mass member to the unsprung mass member; and third calculation means for calculating the target damping force by multiplication of the calculated damping coefficient and the detected or estimated relative velocity.

13. A control system in a suspension mechanism as claimed in claim 3, wherein a physical amount related to vertical movement of the sprung and unsprung mass members is applied as an evaluation output of a generalized plant estimated to calculate the target damping force, and wherein the physical amount is applied with a predetermined frequency weight.

14. A control system as claimed in claim 13, wherein the physical amount includes plural kinds of physical amounts, and wherein each maximum range of frequency weights applied to the physical amounts is determined without any mutual interference.

15. A control system as claimed in claim 14, wherein the physical amounts includes at least two factors selected from a vertical velocity of the sprung mass member, a relative velocity of the sprung mass member to the unsprung mass member and a vertical acceleration of the sprung mass member.

16. A control system in a suspension mechanism as claimed in claim 3, wherein the control theory is adapted to a suspension mechanism of a wheeled vehicle wherein a vertical displacement amount of a road wheel tire, a vertical relative displacement amount of the sprung mass member to the unsprung mass member, a vertical velocity of the unsprung mass member and a vertical velocity of the sprung mass member are defined as a state amount indicative of a state space of the suspension mechanism.

17. A control system for a resilient support mechanism including a damper assembled therein for resiliently supporting an object thereon, wherein a control theory capable of providing a specification for design of the control system in a predetermined frequency range is applied to a nonlinear plant to calculate a target damping coefficient and to adjust an actual damping coefficient of the damper to the calculated target damping coefficient.

18. A control system for a resilient support mechanism in a wheeled vehicle, the support mechanism including a damper assembled therein for resiliently supporting an object thereon, wherein a control theory capable of providing a specification for design of the control system in a predetermined frequency range is applied to a nonlinear plant to calculate a target damping coefficient and to adjust an actual damping coefficient of the damper to the target damping coefficient.

19. A control system for a suspension mechanism of a wheeled vehicle including a damper disposed between an unsprung mass member and a sprung mass member of the vehicle for resiliently supporting the sprung mass member thereon, wherein a control theory capable of providing a specification for design of the control system in a predetermined frequency range is applied to a nonlinear plant to calculate a target damping coefficient and to adjust an actual damping coefficient of the damper to the calculated target damping coefficient.

20. A control system as claimed in claim 17, wherein a nonlinear $H_\infty$ control theory is applied as the control theory.

21. A control system as claimed claim 17, wherein one of a nonlinear $H_\infty$ state feedback control, a nonlinear $H_\infty$ output feedback control or a nonlinear $H_\infty$ control using a Kalman filter is applied as a control based on the control theory.

22. A control system as claimed in claim 17, wherein the damping coefficient is divided into a linear portion and a nonlinear portion, and wherein each gain of the linear portion and the nonlinear portion is defined in such a manner that the target damping coefficient is determined in a range of a damping force produced by the damper.

23. A control system as claimed in claim 22, wherein the linear portion of the damping coefficient of the damper or shock absorber is defined to be located between a minimum damping force of the damper or shock absorber and a maximum damping force of the damper or shock absorber.

24. A control system as claimed in claim 17, wherein the damper is constructed to be switched over at plural steps, wherein the damping coefficient of the damper is divided into a linear portion and a nonlinear portion, and wherein the linear portion of the damping coefficient is determined in such a manner that a damping force defined by the linear portion becomes approximately equal to a damping force produced by the damper at its either on of its plural steps in a small range.

25. A control system as claimed in claim 17, wherein the damping coefficient of the damper is divided into a linear portion and a nonlinear portion, wherein the nonlinear portion is applied as a control input to a generalized plant estimated to calculate the target damping coefficient, and wherein the control input is applied with a predetermined frequency weight.

26. A control system as claimed in claim 17, wherein the damping coefficient of the damper is divided into a linear portion and a nonlinear portion, and wherein the control system comprises:

first calculation means for calculating the nonlinear portion based on the control theory; and second calculation means for calculating the target damping coefficient on a basis of synthesis of the linear portion and the calculated nonlinear portion.

27. A control system for a suspension mechanism as claimed in claim 19, comprising:

detection means for detecting a state amount related to vertical movement of the sprung and unsprung mass members; and means for memorizing a positive definite symmetric solution obtained on a basis of the control theory and for calculating the target damping coefficient based on the memorized positive definite symmetric solution and the detected state amount.

28. A control system for a suspension mechanism as claimed in claim 19, comprising:

detection means for detecting a portion of a plurality of state amounts related to vertical movement of the sprung and unsprung mass members;

estimation means for estimating another portion of the state amounts by using an observer; and means for memorizing a positive definite symmetric solution obtained on a basis of the control theory and for calculating the target damping coefficient based on the memorized positive definite symmetric solution, the detected state amount and the estimated state amount.

29. A control system for a suspension mechanism as claimed in claim 19, wherein a physical amount related to vertical movement of the sprung and unsprung mass members is applied as an evaluation output of a generalized plant estimated to calculate the target damping coefficient, and wherein the physical amount is applied with a predetermined frequency weight.

30. A control system for a suspension mechanism as claimed in claim 29, wherein the physical amount includes plural kinds of physical amounts, and wherein each maximum range of frequency weights applied to the physical amounts is determined without any mutual interference.

31. A control system for a suspension mechanism as claimed in claim 30, wherein the physical amounts includes at least two factors selected from a vertical velocity of the sprung mass member, a relative velocity of the sprung mass member to the unsprung mass member and a vertical acceleration of the sprung mass member.

32. A control system for a suspension mechanism as claimed in claim 19, wherein the control theory is adapted to a suspension mechanism of a wheeled vehicle wherein a vertical displacement amount of a road wheel tire, a vertical relative displacement amount of the sprung mass member to the unsprung mass member, a vertical velocity of the unsprung mass member and a vertical velocity of the sprung mass member are defined as a state amount indicative of a state spaced of the suspension mechanism.

33. A control system for a suspension mechanism including a damper disposed between an unsprung mass member and a sprung mass member of a wheeled vehicle, wherein a damping coefficient of the damper is divided into a linear portion and a nonlinear portion, wherein a control theory capable of providing a specification for design of the control system in a predetermined frequency range is applied to a nonlinear plant to calculate a target damping force and to adjust an actual damping force of the damper to the calculated target damping force, and wherein the control system comprises:

detection means for detecting a travel speed of the vehicle; and control means for controlling the linear portion of the damping coefficient in accordance with the detected travel speed of the vehicle.

34. A control system for a suspension mechanism including a damper disposed between an unsprung mass member and a sprung mass member of a wheeled vehicle, wherein a damping coefficient of the damper is divided into a linear portion and a nonlinear portion, wherein a control theory capable of providing a specification for design of the control system in a predetermined frequency range is applied to a nonlinear plant to calculate a target damping force and to adjust an actual damping force of the damper to the calculated target damping force, and wherein the control system comprises:

detection means for detecting a mass of the sprung mass member; and control means for controlling the linear portion of the damping coefficient in accordance with the detected mass of the sprung mass member.

35. A control system for a suspension mechanism of a wheeled vehicle including a damper disposed between an unsprung mass member and a sprung mass member of the vehicle, wherein a generalized nonlinear plant is estimated to calculate a target damping force on a basis of a control theory capable of providing a specification for design in a predetermined frequency range and to adjust a damping force of the damper to the calculated target damping force, and wherein the control system comprises:

detection means for detecting a travel speed of the vehicle; and control means for controlling a frequency in the generalized plant in accordance with the detected travel speed of the vehicle.

36. A control system for a suspension mechanism of a wheeled vehicle including a damper disposed between an unsprung mass member and a sprung mass member of the vehicle, wherein a control theory capable of providing a specification for design of the control system in a predetermined frequency range is applied to a nonlinear plant to calculate a target damping force and to adjust an actual damping force of the damper to the calculated target damping force, and wherein the control system comprises:

detection means for detecting a mass of the sprung mass member; and control means for controlling a frequency weight in the generalized plant in accordance with the detected mass of the sprung mass member.

37. A control system for a suspension mechanism of a wheeled vehicle including a damper disposed between an unsprung mass member and a sprung mass member of the vehicle, wherein a damping coefficient of the damper is divided into a linear portion and a nonlinear portion, and a control theory capable of providing a specification for design of the control system in a predetermined frequency range is applied to a nonlinear plant to calculate a target damping force and to adjust an actual damping force of the damper to the calculated target damping force, and wherein the control system comprises:

control means for controlling the linear portion of the damping coefficient in accordance with a condition of the vehicle; and means for prohibiting a change of the linear portion of the damping coefficient when the calculated target damping force changes more than a predetermined value in response to change of the linear portion of the damping coefficient.

38. A control system for a suspension mechanism of a wheeled vehicle including a damper disposed between an unsprung mass member and a sprung mass member of the vehicle, wherein a control theory capable of providing a specification for design of the control system in a predetermined frequency range is applied to a generalized nonlinear plant to calculate a target damping force and to adjust an actual damping force of the damper to the calculated target damping force, and wherein the control system comprises:

control means for controlling a frequency weight in the generalized plant in accordance with a condition of the vehicle; and means for prohibiting change of the frequency weight when the calculated target damping force changes more than a predetermined value due to change of the frequency weight.

* * * * *